US012739102B2

(12) United States Patent
Akiyama

(10) Patent No.: US 12,739,102 B2
(45) Date of Patent: Sep. 15, 2026

(54) ENCRYPTION DEVICE, KEY GENERATION DEVICE, AND COMPUTER PROGRAM PRODUCT FOR ENCRYPTION USING INDETERMINATE POLYNOMIAL EQUATIONS

(71) Applicant: KABUSHIKI KAISHA TOSHIBA, Tokyo (JP)

(72) Inventor: Koichiro Akiyama, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 108 days.

(21) Appl. No.: 18/459,261

(22) Filed: Aug. 31, 2023

(65) Prior Publication Data

US 2024/0195607 A1 Jun. 13, 2024

(30) Foreign Application Priority Data

Dec. 6, 2022 (JP) ................................ 2022-195059

(51) Int. Cl.
*H04L 9/08* (2006.01)

(52) U.S. Cl.
CPC .......... *H04L 9/0825* (2013.01); *H04L 9/0869* (2013.01)

(58) Field of Classification Search
CPC ............................ H04L 9/0825; H04L 9/0869
(Continued)

(56) References Cited

U.S. PATENT DOCUMENTS 5,740,250 A 4/1998 Moh
6,959,085 B1 * 10/2005 Hoffstein ................ H04L 9/008 713/168

(Continued)

FOREIGN PATENT DOCUMENTS

JP 2010-204466 A 9/2010
JP 2021-124679 A 8/2021

(Continued)

OTHER PUBLICATIONS

Abdelrahaman Aly, "Design of Symmetric-Key Primitives for Advances Cryptographic Protocols," IACR Trans. on Symmetric Cryptology, vol. 2020, No. 3, pp. 1-45 (2020).

(Continued)

*Primary Examiner* — Moeen Khan
(74) *Attorney, Agent, or Firm* — Finnegan, Henderson, Farabow, Garrett & Dunner, LLP

(57) ABSTRACT

According to one embodiment, an encryption device includes a memory and one or more processors. The one or more processors are configured to: acquire, as a public key, an n-variable symmetric indeterminate equation having an element not more than a constant degree of $F_p[t]$ and determined depending on a total degree of each term, and being symmetric for at least two variables; randomly generate an n-variable polynomial having an element not more than a constant degree of $F_p[t]$, randomly generate an n-variable symmetric polynomial having an element not more than a constant degree of $F_p[t]$ and determined depending on a total degree of each term, and being symmetric for at least two variables, and randomly generate a noise polynomial having an element not more than a constant degree of $F_p[t]$; and generate a ciphertext from the three polynomials and the n-variable symmetric indeterminate equation for the n-variable plaintext polynomial.

1 Claim, 14 Drawing Sheets

(58) Field of Classification Search
USPC .......................................................... 713/171
See application file for complete search history.

(56) References Cited

U.S. PATENT DOCUMENTS

| | | | | |
|---|---|---|---|---|
| 7,773,747 | B2 | 8/2010 | Akiyama | |
| 7,787,623 | B2 * | 8/2010 | Akiyama | H04L 9/3026 380/46 |
| 8,356,183 | B2 | 1/2013 | Takahashi | |
| 8,522,033 | B2 | 8/2013 | Sakumoto | |
| 8,532,289 | B2 | 9/2013 | Gentry et al. | |
| 11,288,985 | B2 | 3/2022 | Akiyama | |
| 12,034,850 | B2 | 7/2024 | Akiyama | |
| 2002/0001383 | A1 | 1/2002 | Kasahara | |
| 2004/0151307 | A1 | 8/2004 | Wang et al. | |
| 2006/0251247 | A1 * | 11/2006 | Akiyama | B82Y 10/00 380/28 |
| 2007/0061572 | A1 | 3/2007 | Imai | |
| 2007/0110232 | A1 | 5/2007 | Akiyama | |
| 2008/0019511 | A1 | 1/2008 | Akiyama | |
| 2009/0185680 | A1 | 7/2009 | Akiyama | |
| 2010/0054480 | A1 | 3/2010 | Schneider | |
| 2010/0226496 | A1 | 9/2010 | Akiyama et al. | |
| 2010/0329447 | A1 | 12/2010 | Akiyama | |
| 2012/0039473 | A1 | 2/2012 | Gentry | |
| 2013/0089201 | A1 | 4/2013 | Sakumoto | |
| 2013/0177151 | A1 | 7/2013 | Sella et al. | |
| 2015/0033025 | A1 | 1/2015 | Hoffstein | |
| 2015/0172258 | A1 * | 6/2015 | Komano | H04L 9/008 380/259 |
| 2016/0119120 | A1 | 4/2016 | Wang | |
| 2018/0034630 | A1 | 2/2018 | Rietman | |
| 2019/0312728 | A1 | 10/2019 | Poeppelmann | |
| 2021/0248928 | A1 * | 8/2021 | Akiyama | H04L 9/0825 |
| 2022/0150064 | A1 | 5/2022 | Akiyama | |
| 2024/0195607 | A1 | 6/2024 | Akiyama | |
| 2024/0205006 | A1 | 6/2024 | Akiyama | |
| 2024/0214201 | A1 | 6/2024 | Hoshizuki et al. | |

FOREIGN PATENT DOCUMENTS

| | | | |
|---|---|---|---|
| JP | 2022-77754 | A | 5/2022 |
| JP | 2024-81510 | A | 6/2024 |

OTHER PUBLICATIONS

Craig Gentry, "Fully Homomorphic Encryption Using Ideal Lattices," ACM Symp. on Theory of Computing, pp. 169-178, DOI:10.1145/1536414.1536440 (2009).

Tsuyoshi Takagi et al., "The Multi-variable Modular Polynomial and Its Applications to Cryptography," Int'l Symp. on Algorithms and Computation, pp. 386-396 (1996).

Michele Mosca, "Cybersecurity in an era with quantum computers: will we be ready?," DOI:10.1109/MSP.2018.3761723, 4 pages (2018).

USPTO, Office Action in U.S. Appl. No. 18/458,570 (Apr. 25, 2025).

USPTO, Office Action in U.S. Appl. No. 17/459,320 (Mar. 17, 2023).

USPTO, Final Office Action in U.S. Appl. No. 17/459,320 (Sep. 29, 2023).

USPTO, Notice of Allowance in U.S. Appl. No. 17/459,320 (May 2, 2024).

USPTO, Notice of Allowance in U.S. Appl. No. 17/004,211 (Dec. 24, 2021).

Zhicheng Gao et al., "Degree Distribution of the Greatest Common Divisor of Polynomials over $F_q$," Random Structures and Algorithms, Random Structures & Algorithms, vol. 29, No. 1, pp. 26-37, DOI: 10.1002/rsa20093 (2006).

J.von zur Gathen et al, "Approximate polynomial gcd: Small degree and small height perturbations," J. of Symbolic Computations, vol. 45, pp. 879-886, DOI: 10.1016/j.jsc.2010.04.001 (2010).

Yuichi Komano et al., "Algebraic Surface Cryptosystems using Polynomial Approximate GCD," IEICE Technical Report ISEC2016-35, ITE2016-29, ICSS2016-35, EMM2016-43(Jul. 2016), pp. 217-222, and translation, 12 pages (2016).

Yuto Mashima et al., "C language implementation of an indeterminate equation encryption scheme based on the approximate ideal GCD problem and fast implementation using Karatsuba method," Information Processing Society of Japan Computer Security Symposium 2022, pp. 698-705 (2022).

Japan Patent Office, Office Action in JP App. No. 2022-195059 (Aug. 5, 2025).

USPTO, Notice of Allowance in U.S. Appl. No. 18/458,570, (Aug. 21, 2025).

* cited by examiner

FIG.1

Algorithm 1 APPROXIMATE GCD ALGORITHM

Require: $f_1(t), f_2(t), \deg s(t)$ $(f_1(t) = s(t)e_1(t) + a_1(t),\ f_2(t) = s(t)e_2(t) + a_2(t))$
Ensure: $s(t)e'(t)(e'(t) = GCD(e_1(t), e_2(t)))$

```
for D = deg s(t) to deg s(t) + n do
  r1 := f1(t); r2 := f2(t); s1 := 1; s2 := 0;
  t1 := 0; t2 := 1;
  while r2 ≠ 0 do
    q = r1/r2; dmy := r1 − q · r2; r1 := r2; r2 := dmy
    dmy := s1 − q · s2; s1 := s2; s2 := dmy
    dmy := t1 − q · t2; t1 := t2; t2 := dmy
    if (deg f1(t) − deg t2 = D) ∧ (deg f2(t) − deg s2 = D) then
      break
    end if
  end while
  if (s2 = 0) ∨ (t2 = 0) then
    continue
  end if
end for
if (s2 = 0) ∨ (t2 = 0) then
  return error
else
  s(t)e'(t) := f1(t)/t2
  a1(t) := f1(t) mod s(t)e'(t); a2(t) := f2(t) mod s(t)e'(t)
  return s(t)e'(t), a1(t), a2(t)
end if
```

FIG.2

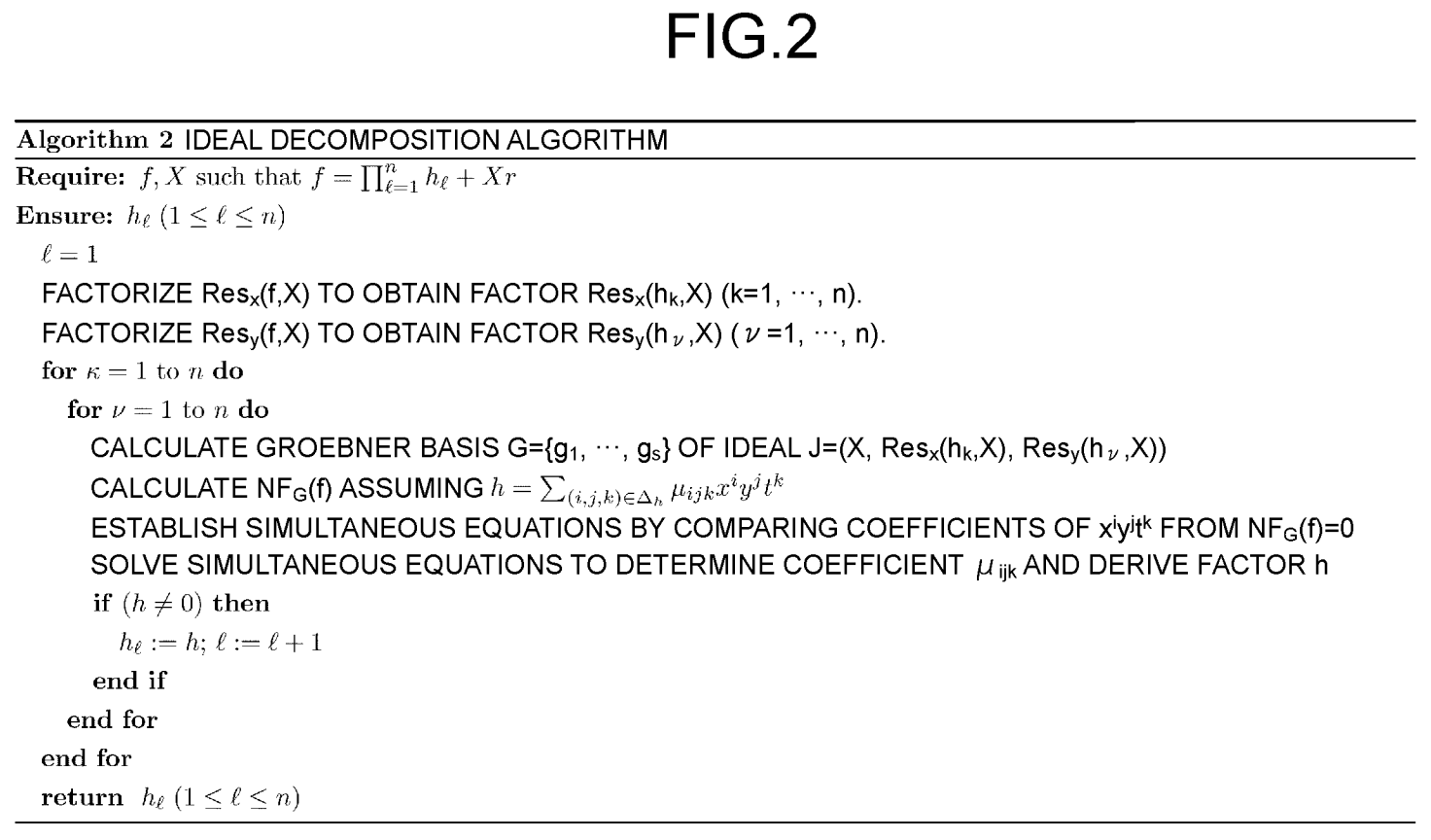

Algorithm 2 IDEAL DECOMPOSITION ALGORITHM

Require: $f, X$ such that $f = \prod_{\ell=1}^{n} h_\ell + Xr$

Ensure: $h_\ell$ $(1 \leq \ell \leq n)$ $\ell = 1$

FACTORIZE $Res_x(f,X)$ TO OBTAIN FACTOR $Res_x(h_k,X)$ (k=1, ⋯, n).

FACTORIZE $Res_y(f,X)$ TO OBTAIN FACTOR $Res_y(h_\nu,X)$ ($\nu$=1, ⋯, n).

for $\kappa = 1$ to $n$ do for $\nu = 1$ to $n$ do

CALCULATE GROEBNER BASIS G={$g_1$, ⋯, $g_s$} OF IDEAL J=(X, $Res_x(h_k,X)$, $Res_y(h_\nu,X)$)

CALCULATE $NF_G(f)$ ASSUMING $h = \sum_{(i,j,k) \in \Delta_h} \mu_{ijk} x^i y^j t^k$ ESTABLISH SIMULTANEOUS EQUATIONS BY COMPARING COEFFICIENTS OF $x^i y^j t^k$ FROM $NF_G(f)=0$ SOLVE SIMULTANEOUS EQUATIONS TO DETERMINE COEFFICIENT $\mu_{ijk}$ AND DERIVE FACTOR h if $(h \neq 0)$ then

$h_\ell := h;\ \ell := \ell + 1$ end if end for end for return $h_\ell$ $(1 \leq \ell \leq n)$

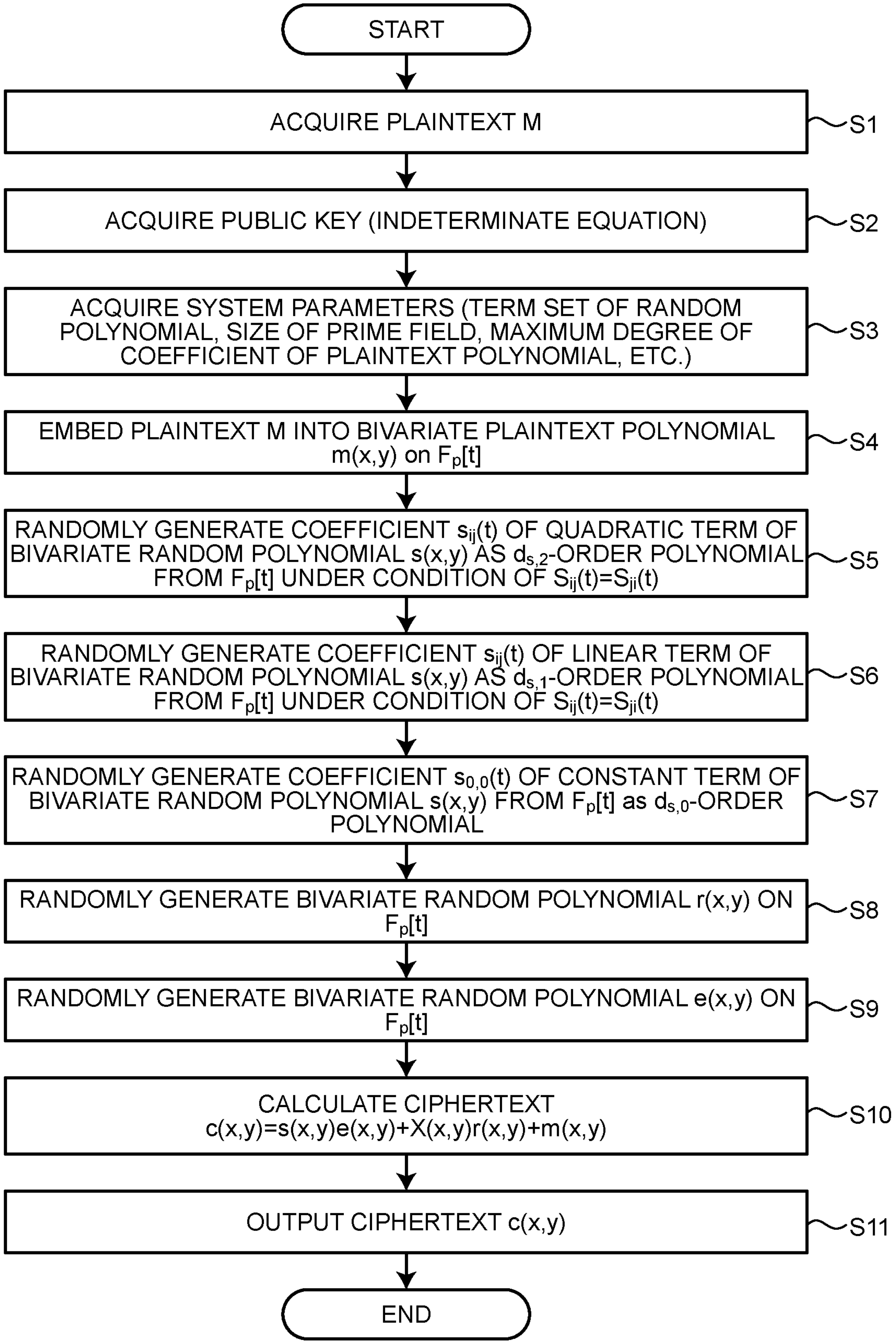

FIG.4
START
ACQUIRE PLAINTEXT M
S1
ACQUIRE PUBLIC KEY (INDETERMINATE EQUATION)
S2
ACQUIRE SYSTEM PARAMETERS (TERM SET OF RANDOM POLYNOMIAL, SIZE OF PRIME FIELD, MAXIMUM DEGREE OF COEFFICIENT OF PLAINTEXT POLYNOMIAL, ETC.)
S3
EMBED PLAINTEXT M INTO BIVARIATE PLAINTEXT POLYNOMIAL $m(x,y)$ on $F_p[t]$
S4
RANDOMLY GENERATE COEFFICIENT $s_{ij}(t)$ OF QUADRATIC TERM OF BIVARIATE RANDOM POLYNOMIAL $s(x,y)$ AS $d_{s,2}$-ORDER POLYNOMIAL FROM $F_p[t]$ UNDER CONDITION OF $S_{ij}(t)=S_{ji}(t)$
S5
RANDOMLY GENERATE COEFFICIENT $s_{ij}(t)$ OF LINEAR TERM OF BIVARIATE RANDOM POLYNOMIAL $s(x,y)$ AS $d_{s,1}$-ORDER POLYNOMIAL FROM $F_p[t]$ UNDER CONDITION OF $S_{ij}(t)=S_{ji}(t)$
S6
RANDOMLY GENERATE COEFFICIENT $s_{0,0}(t)$ OF CONSTANT TERM OF BIVARIATE RANDOM POLYNOMIAL $s(x,y)$ FROM $F_p[t]$ as $d_{s,0}$-ORDER POLYNOMIAL
S7
RANDOMLY GENERATE BIVARIATE RANDOM POLYNOMIAL $r(x,y)$ ON $F_p[t]$
S8
RANDOMLY GENERATE BIVARIATE RANDOM POLYNOMIAL $e(x,y)$ ON $F_p[t]$
S9
CALCULATE CIPHERTEXT $c(x,y)=s(x,y)e(x,y)+X(x,y)r(x,y)+m(x,y)$
S10
OUTPUT CIPHERTEXT $c(x,y)$
S11
END

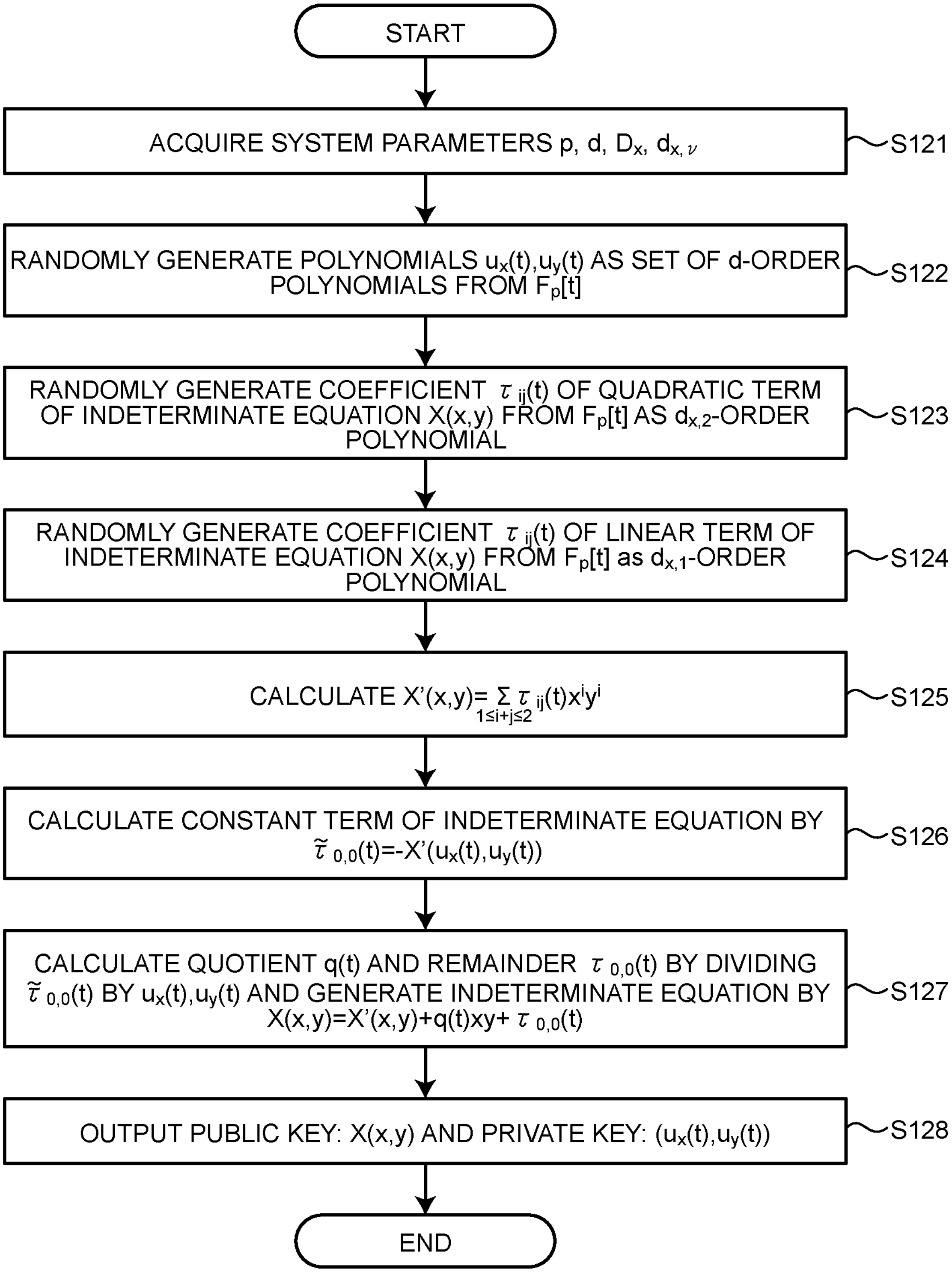

FIG.13

START

S121: ACQUIRE SYSTEM PARAMETERS p, d, $D_x$, $d_{x,\nu}$

S122: RANDOMLY GENERATE POLYNOMIALS $u_x(t)$,$u_y(t)$ AS SET OF d-ORDER POLYNOMIALS FROM $F_p[t]$

S123: RANDOMLY GENERATE COEFFICIENT $\tau_{ij}(t)$ OF QUADRATIC TERM OF INDETERMINATE EQUATION X(x,y) FROM $F_p[t]$ AS $d_{x,2}$-ORDER POLYNOMIAL S124: RANDOMLY GENERATE COEFFICIENT $\tau_{ij}(t)$ OF LINEAR TERM OF INDETERMINATE EQUATION X(x,y) FROM $F_p[t]$ as $d_{x,1}$-ORDER POLYNOMIAL S125: CALCULATE $X'(x,y)=\sum_{1\leq i+j\leq 2} \tau_{ij}(t)x^iy^j$ S126: CALCULATE CONSTANT TERM OF INDETERMINATE EQUATION BY $\tilde{\tau}_{0,0}(t)=-X'(u_x(t),u_y(t))$ S127: CALCULATE QUOTIENT q(t) AND REMAINDER $\tau_{0,0}(t)$ BY DIVIDING $\tilde{\tau}_{0,0}(t)$ BY $u_x(t)$,$u_y(t)$ AND GENERATE INDETERMINATE EQUATION BY $X(x,y)=X'(x,y)+q(t)xy+\tau_{0,0}(t)$ S128: OUTPUT PUBLIC KEY: X(x,y) AND PRIVATE KEY: $(u_x(t),u_y(t))$

END

ENCRYPTION DEVICE, KEY GENERATION DEVICE, AND COMPUTER PROGRAM PRODUCT FOR ENCRYPTION USING INDETERMINATE POLYNOMIAL EQUATIONS

CROSS-REFERENCE TO RELATED APPLICATIONS

This application is based upon and claims the benefit of priority from Japanese Patent Application No. 2022-195059, filed on Dec. 6, 2022; the entire contents of which are incorporated herein by reference.

FIELD

Embodiments described herein relate generally to an encryption device, a decryption device, a key generation device, an encryption method, a decryption method, a key generation method, a computer program product for encryption, a computer program product for decryption, and a computer program product for key generation.

BACKGROUND

Cryptography is a technique widely used as means for protecting the confidentiality and authenticity of information in a networked society in which people communicate with a large amount of information such as e-mails exchanged over a network. On the other hand, even RSA cryptography and elliptic curve cryptography that are currently widely used are exposed to a risk of being decrypted when a quantum computer appears.

A problem to be solved by the present disclosure is to provide an encryption device, a decryption device, a key generation device, an encryption method, a decryption method, a key generation method, a computer program product for encryption, a computer program product for decryption, and a computer program product for key generation, which can ensure security even when a quantum computer appears and can further shorten a key size and a ciphertext size.

BRIEF DESCRIPTION OF THE DRAWINGS

FIG. 1 is a diagram illustrating an example of an approximate GCD algorithm according to an embodiment;

FIG. 2 is a diagram illustrating an example of an ideal decomposition algorithm according to the embodiment;

FIG. 4 is a flowchart illustrating an example of an encryption method according to the embodiment;

FIG. 13 is a flowchart illustrating an example of a key generation method according to a modification (a case where X(x,y) is not a symmetric equation) of the embodiment.

DETAILED DESCRIPTION

Figure 3:
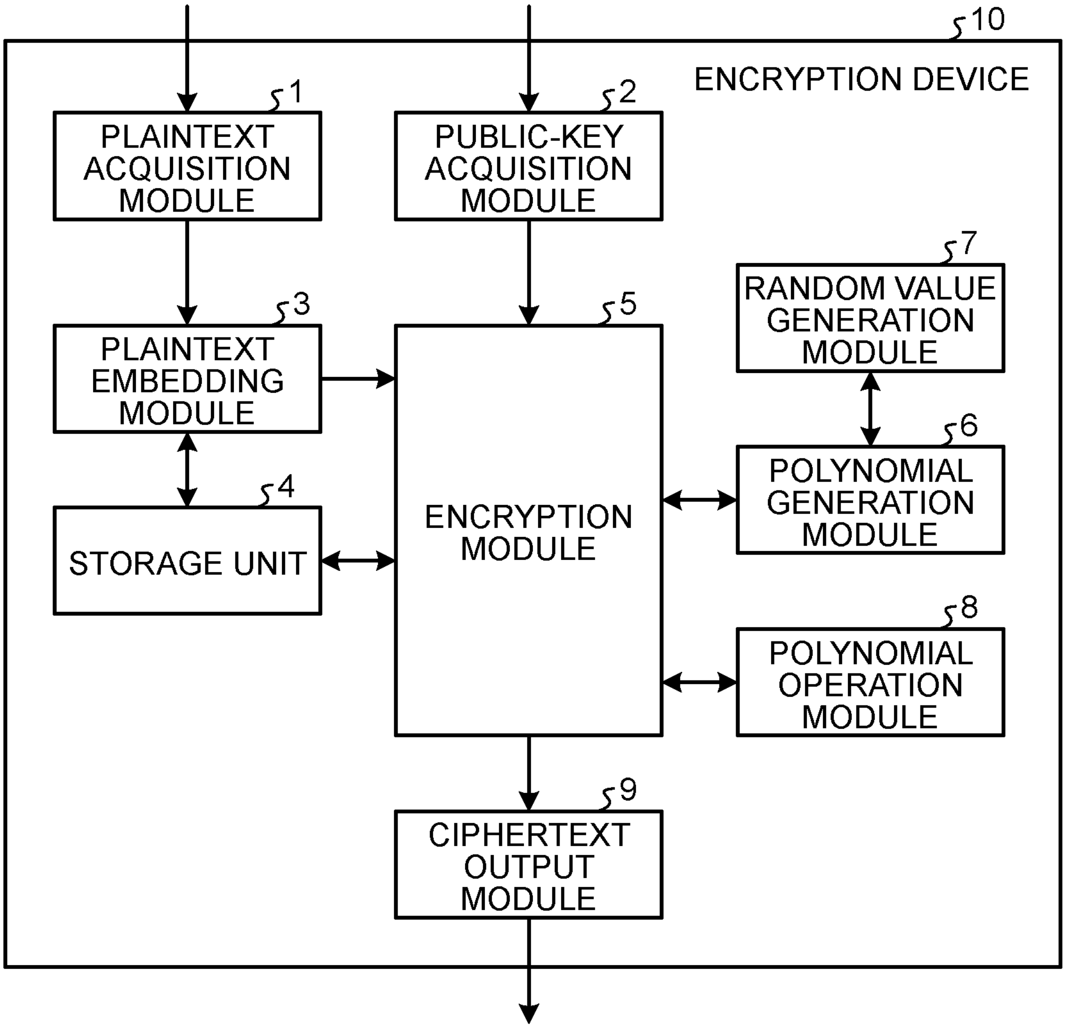
FIG. 3 is a diagram illustrating an example of a functional configuration of an encryption device according to the embodiment.

In general, according to one embodiment, an encryption device includes a memory and one or more processors coupled to the memory. The one or more processors are configured to: acquire an n-variable symmetric indeterminate equation $X(x_1, \ldots, x_n)$ as a public key, the n-variable symmetric indeterminate equation $X(x_1, \ldots, x_n)$ having, as a coefficient, an element that is less than or equal to a constant degree of a univariable polynomial ring $F_p[t]$ on a finite field $F_p$ and is determined depending on a total degree of each term, the n-variable symmetric indeterminate equation $X(x_1, \ldots, x_n)$ being symmetric with respect to at least two variables; embed a plaintext M in coefficients of an n-variable plaintext polynomial $m(x_1, \ldots, x_n)$ having an element less than or equal to a constant degree of the univariable polynomial ring $F_p[t]$ as a coefficient; randomly generate an n-variable polynomial $r(x_1, \ldots, x_n)$ having an element less than or equal to a constant degree of the univariable polynomial ring $F_p[t]$ as a coefficient, randomly generate an n-variable symmetric polynomial $s(x_1, \ldots, x_n)$ having an element that is less than or equal to a constant degree of the univariable polynomial ring $F_p[t]$ as a coefficient and is determined depending on a total degree of each term, and being symmetric with respect to at least two variables, and randomly generate a noise polynomial $e(x_1, \ldots, x_n)$ having an element less than or equal to a constant degree of the univariable polynomial ring $F_p[t]$ as a coefficient; and generate a ciphertext $c(x_1, \ldots, x_n)$ by encryption processing of performing an operation including at least one of addition, subtraction, and multiplication of the n-variable polynomial $r(x_1, \ldots, x_n)$, the n-variable symmetric polynomial $s(x_1, \ldots, x_n)$, the noise polynomial $e(x_1, \ldots, x_n)$, and the n-variable symmetric indeterminate equation $X(x_1, \ldots, x_n)$ on the n-variable plaintext polynomial $m(x_1, \ldots, x_n)$.

Exemplary embodiments of an encryption device, a decryption device, a key generation device, an encryption method, a decryption method, a key generation method, a computer program product for encryption, a computer program product for decryption, and a computer program product for key generation will be described below in detail with reference to the accompanying drawings. The present invention is not limited to the following embodiments.

The cryptography can be broadly divided into a common-key cryptography and a public-key cryptography. The common-key cryptography is an encryption scheme based on a data scrambling algorithm, and enables high-speed encryption/decryption, while secret communication and authentication communication can only be performed between two parties having a common key in advance. Public-key cryptography is an encryption scheme based on a mathematical algorithm, and is not as fast in encryption/decryption as common-key cryptography, but it does not require prior key sharing. Public-key cryptography is characterized in that, at the time of communication, secret communication is realized using a public key disclosed by a transmission counterparty, and authentication communication can be performed by applying a digital signature (preventing impersonation) using a private key of a sender.

For this reason, the common-key cryptography is mainly used for encrypting information that needs to be decrypted in real time after reception like paid digital broadcasting, and a method is adopted in which the decryption key is distributed only to the subscriber using a key distribution system called a separate conditional access system. On the other hand, in an online site established on the Internet, it is necessary to encrypt customer information (credit card numbers, addresses, and the like) in order to protect the customer information from eavesdropping, but it is not always possible to issue an encryption key in advance, and thus, public-key cryptography is often used.

Typical public-key cryptography includes RSA cryptography and elliptic curve cryptography. In RSA cryptography, the difficulty of the prime factorization problem serves as the basis of security, and the modulo exponentiation operation is used as an encryption operation. In elliptic curve cryptography, the difficulty of the discrete logarithm problem on an elliptic curve serves as the basis of security, and the point operation on the elliptic curve is used for the encryption operation. Although a decrypting method for a specific key (public key) has been proposed for these public-key cryptography, a general decrypting method is not known, and therefore, no serious problem regarding the security has been found so far except for a decrypting method by a quantum computer described later.

Other examples of the public-key cryptography include knapsack cryptography with the difficulty of the knapsack problem (known as the NP problem) serving as the basis of security, and multivariable cryptography constructed using the field extension theory and with the solving problems of simultaneous equations serving as the basis of security. However, with regard to knapsack cryptography, decrypting methods are already known in almost all implementations.

While powerful attack methods are known for multivariable cryptography, there are also implementations in which the known decrypting methods do not work, so that security is considerably impaired but is not decisive. However, the key size required to avoid known decrypting methods is increasing.

On the other hand, even RSA cryptography and elliptic curve cryptography that are currently widely used are exposed to a risk of being decrypted when a quantum computer appears. A quantum computer is a computer that can perform massively parallel calculation (based on a principle different from that of current computers) using a physical phenomenon called entanglement known in quantum mechanics.

Until a few years ago, a quantum computer has been considered to be a virtual computer whose operation has been confirmed only at an experimental level. However, recently, it has been illustrated that the quantum computer has performance exceeding that of a classical computer (quantum exceeding), and efforts to realize the quantum computer have been rapidly advanced. In 1994, Shor showed that an algorithm that efficiently solves prime factorization and discrete logarithm problems can be constructed using this quantum computer. That is, if the quantum computer is realized, the RSA cryptography based on prime factorization and the elliptic curve cryptography based on the discrete logarithm problem (on the elliptic curve) can be decrypted.

Under such circumstances, research on public-key cryptography having a possibility of maintaining security even if a quantum computer is realized has been actively conducted in recent years. Lattice-based cryptography is an example of public-key cryptography that can be realized even at the present time and that is considered to be difficult to break even by a quantum computer. Lattice-based cryptography is public-key cryptography in which a problem (shortest vector problem) of obtaining a point closest to an origin among points other than the origin in a discrete n-dimensional vector space (linear space) called lattice is used as the basis of security.

The shortest vector problem is an NP-hard problem, but since it is a linear problem, small-sized problems can be easily solved. Therefore, the number of dimensions for realizing security is increased, and the key size of a public key, a private key, or the like is increased, and there is little possibility of application to low-end devices in particular. Furthermore, since public-key cryptography requires a larger circuit scale and takes a longer processing time than common-key cryptography, there is a problem that public-key cryptography cannot be implemented in a low-power environment such as a mobile terminal, or it takes a longer processing time even if public-key cryptography is implemented. Therefore, there is a demand for public-key cryptography that can be realized even in a low-power environment.

In general, public-key cryptography is constructed to find computational hard problems (such as a prime factorization problem or a discrete logarithm problem), and decrypt a ciphertext (without knowing a private key) in such a way that is equivalent to solving the computational hard problems. However, conversely, even if one computational hard problem is defined, it is not always possible to easily construct public-key cryptography that uses the problem as the basis of security. This is because, if the security is based on a problem that is too computational hard, a problem of generating a key will be also difficult and public-key cryptography cannot be constructed. On the other hand, if the problem is made easy to the extent that the key can be generated, the decryption will become easy.

Therefore, creativity is thus required to configure public-key cryptography in finding a computational hard problem and to recreate the problem into a problem having an exquisite balance such that it is easy to generate a key but not easy to decrypt (without knowing the generated private key). Since the configuration of this part is difficult, only a few public-key cryptography has been proposed so far. Under such circumstances, public-key cryptography using an algebraic surface (JP 2010-204466 A) has been proposed as public-key cryptography that cannot be efficiently decrypted even by calculation by a quantum computer and that is expected to be processed at high speed even in a low-power environment.

The public-key cryptography of JP 2010-204466 A has a private key as two sections corresponding to an algebraic surface X(x,y,t), a public key as the algebraic surface X(x,y,t), and includes a polynomial generation module and an encryption module. The polynomial generation module performs processing of embedding a plaintext m in a plaintext polynomial m(x,y,t) and processing of generating random polynomials h(x,y,t), $s_1(x,y,t)$, $s_2(x,y,t)$, $r_1(x,y,t)$, and $r_2(x,y,t)$ of three variables x, y, t. The encryption module generates two ciphertexts $c_1=E_{pk}(m, s_1, r_1, h, X)$ and $c_2=E_{pk}(m, s_2, r_2, h, X)$ from the plaintext polynomial m(x,y,t) by encryption processing of performing an operation including at least one of addition, subtraction, and multiplication of each polynomial and a definition expression X(x,y,t). Although the ciphertext has nonlinearity, the public-key cryptography of JP 2010-204466 A is decrypted because there are two ciphertexts and there is no noise term.

In order to reinforce this, JP 2022-77754 A proposes a method in which noise polynomials $e_1$ and $e_2$ are added. Although this method has nonlinearity of taking the product of unknown parts $m(x,y)s_1(x,y)$ and $m(x,y)s_2(x,y)$ in the ciphertext, computational hardness of the solving problem varies depending on characteristics of the indeterminate equation X(x,y) serving as a public key. This method has a problem that the key size (the public key size and the private key size) and the ciphertext size increase by the selection of X(x,y).

In the following embodiment, in view of such a current situation, public-key cryptography capable of reducing a key size, a ciphertext size, and the like is constructed by setting such that security can be secured even when a quantum computer appears and the computational hardness of the solving problem of the indeterminate equation X(x,y)=0 as a public key is increased.

Description of Algebra

First, the algebra used in the embodiment is defined. First, a set of integers is represented by Z, and a remainder of the integer Z at a natural number p is referred to as $Z_p$. Since $Z_p$ is a remainder, and is generally described as follows.

$$Z_p = \{[0], [1], \ldots , [p-1]\}$$

Here, each element of $Z_p$ satisfies the following properties, so that addition, subtraction, and multiplication are defined.

$$[a]+[b]=[a+b]$$

$$[a]-[b]=[a-b]$$

$$[a]\cdot[b]=[a\cdot b]$$

In this way, a set that can be defined by addition, subtraction, and multiplication, satisfies the associative law, and has an inverse element [−x] ([x]+[−x]=[0]) that makes the unit element 0 by added to an element x is referred to as a ring. Furthermore, a ring on which the commutative law ([a]+[b]=[b]+[a], [a]·[b]=[b]·[a]) is established is referred to as a commutative ring, and in addition, when it has the unit element [1] of the multiplication method, it is referred to as a commutative ring having the unit element.

The division can be defined only for [b] in which an element [x] satisfying [b]·[x]=[x]·[b]=[1] exists, and when such an element [x] exists, [x] is referred to as an inverse element of [b], and is expressed as [b−1]. That is, division [a]/[b] for [b] with an inverse element is calculated by multiplying [a] by the inverse element [b−1]([a]·$[b^{-1}]$) satisfying the following.

$$[b]\cdot[b]^{-1}=[1]$$

A necessary and sufficient condition for the presence of the inverse element [b-1] in the element [b] of $Z_p$ is GCD (b,p)=1. That is, the element b of $Z_p$ has an inverse element [b−1] when and only when b and p are coprime. For example, when p=5 and b=3, $[3^{-1}]$=[2] because 3 and 5 are coprime. However, in a case of p=6, GCD(3, 6)=3 is obtained, and the elements are not coprime, and there is no inverse element, so that division cannot be realized.

Now, [0] represents a set in which the remainder when divided by p is 0. It can be more explicitly expressed as follows.

$$[0]=\{\ldots, -2p, -p, 0, p, 2p, \ldots\}$$

In defining the operation for $Z_p$, since the answer is the same regardless of the element of the set [0], the calculation is performed using one representative element (representative element) included in the set [0] for the sake of simplicity. This representative element may be any element as long as it is included in this set (from its properties), but in the embodiment, it is represented by 0 for the sake of simplicity. Similarly, [1] is represented by a minimum positive integer such as 1 and [2] is represented by 2, and $Z_p$ is represented by {0, 1, . . . , p−1}.

Here, when p is a prime number, all the representative elements other than 0 are coprime to p, and division can be defined. That is, when p is a prime number, addition, subtraction, multiplication, and division can be defined for $Z_p$. In this manner, a set which is a commutative ring and in which an element other than 0 has an inverse element with respect to a multiplication method is referred to as a field. In particular, a field composed of a finite number of elements such as $Z_p$ where p is a prime number is referred to as a finite field. The cardinality of the finite fields is a prime number or a power of a prime number, and the former is referred to as a prime field. That is, $Z_p$ mentioned herein is a prime field. In order to make it clear that it is a finite field, it is described as $F_p$ below.

Next, the notation and definitions related to polynomials will be described. A set of univariable polynomials having the prime field $F_p$ as a coefficient is described as $F_p[t]$. As can be easily understood, addition, subtraction, and multiplication can be defined for $F_p[t]$, but division of polynomials is not established because there is no inverse element except for a polynomial including only constant terms.

Notation of Multivariable Polynomial

Next, terms and symbols relating to a bivariable polynomial are defined. First, a bivariable polynomial on the univariable polynomial ring $F_p[t]$ is described by the following formula (1).

$$\xi(x,y)=\sum_{(i,j)\in\Gamma_\xi}\tau_{i,j}(t)x^iy^j \quad (1)$$

Here, $\tau_{i,j}(t)$ is an element of the univariable polynomial ring $F_p[t]$. A set Ig is a set of pairs (i(x index), j (y index)) of non-zero monomial exponents included in a polynomial ξ(x,y), and is referred to as a term set of a bivariable polynomial ξ(x,y).

For example, the term set of the polynomial on $Z_7$ of the following formula (2) is the following formula (3).

$$\xi(x, y) = 5x^3 + 3x^2y + y^2 + 4x + 1 \tag{2}$$

$$\Gamma_\xi\{(3, 0), (2, 1), (0, 2), (1, 0), (0, 0)\} \tag{3}$$

Here, the number of elements of $\Gamma_\xi$ coincides with the number of monomials of the bivariable polynomial $\xi(x,y)$. In addition, in the following description, in a case where it is clear that it is a bivariable polynomial, $\xi(x,y)$ may be simply written as $\xi$.

In the embodiment, for the sake of simplicity, the term set of the D-degree bivariable polynomial is defined as the maximum term set, and expressed as ID. That is, when D=2, the following formula (4) is obtained, and when D=3, the following formula (5) is obtained.

$$\Gamma_2 = \{(2, 0), (1, 1), (0, 2), (1, 0), (0, 1), (0, 0)\} \tag{4}$$

$$\Gamma_3 = \{(3, 0), (2, 1), (1, 2), (0, 3), (0, 2), (1, 1), (0, 2), (1, 0), (0, 1), (0, 0)\} \tag{5}$$

The $\Gamma_3$ includes the term set $\Gamma_\xi$ of the above-described formula (3) as a subset.

When the term set $\Gamma_D$ is given, a set of bivariable polynomials on a univariable polynomial ring $F_p[t]$ having the term set $\Gamma_D$ is defined by the following formula (6).

$$\mathcal{F}_{\Gamma_D}/\mathbb{F}_p[t] = \left\{ f \in \mathbb{F}_p[x, y] \mid f = \sum_{(i,j)\in\Gamma_D} a_{i,j}(t)x^i y^j \right\} \tag{6}$$

Here, $a_{i,j}(t)$ is an element on $F_p[t]$. The left side of the above-described formula (6) may be simply written as $F_{\Gamma D}$. In addition, a case where the degree of the coefficient $a_{i,j}(t)$ is limited to d or less is represented by the following formula (7), and similarly, it may be simply written as $F_{\Gamma D,d}$.

$$\mathcal{F}_{\Gamma_{D,d}}/\mathbb{F}_p[t] = \left\{ f \in \mathbb{F}_p[x, y] \mid f = \sum_{(i,j)\in\Gamma_D} a_{i,j}(t)x^i y^j \text{ s.t. } \deg a_{i,j}(t) \le d \right\} \tag{7}$$

The bivariable polynomial on the univariable polynomial ring $F_p[t]$ is expressed by the following formula (8) as a trivariable polynomial.

$$\xi(x, y) = \sum_{(i,j,k)\in\Delta_\xi} \mu_{i,j,k}(t)x^i y^j t^k \tag{8}$$

Here, $\mu_{i,j,k}$ is an element of the finite field $F_p$. A set $\Delta_\xi$ is a set of pairs (i(x index), j (y index), k (t index)) of non-zero monomial exponents included in a polynomial $\xi(x,y,t)$, and is referred to as a term set of a trivariable polynomial $\xi(x,y,t)$.

For example, the term set of the polynomial (9) on $F_7$ is expressed by the following formula (10).

$$\xi(x, y) = (t^2 + 2t + 6)x^2 + (3t + 5)y^2 + (4t^2 + 1)x + 4t^2 + t + 3 \tag{9}$$

$$\Delta_\xi = \{(2, 0, 2), (2, 0, 1), (2, 0, 0), (0, 2, 1), (0, 2, 0), (1, 0, 2), (1, 0, 0), (0, 0, 2), (0, 0, 1), (0, 0, 0),\} \tag{10}$$

Here, the number of elements of $\Delta_\xi$ coincides with the number of monomials of the trivariable polynomial $\xi(x,y,t)$. In addition, in the following description, in a case where it is clear that it is a trivariable polynomial, $\xi(x,y,t)$ may be simply written as $\xi$.

Note that the notation of the maximum term set follows the notation of the bivariable polynomial, and the maximum term set in which the degree of each coefficient $a_{i,j}(t)$ is limited to d or less in the degree D regarding x and y of the trivariable polynomial is described as $\Delta_{D,d}$.

For example, in a case of D=2 and d=1, the following formula (11) is obtained.

$$\Delta_{2,1} = \{(2, 0, 1), (2, 0, 0), (1, 1, 1), (1, 1, 0), (0, 2, 1), (0, 2, 0), (1, 0, 1), (1, 0, 0), (0, 1, 1), (0, 1, 0), (0, 0, 1), (0, 0, 0)\} \tag{11}$$

Solution and Zero-Point

A pair of elements $(u_x(t), u_y(t))$ on the univariable polynomial ring $F_p[t]$ satisfying the equation X(x,y)=0 on the univariable polynomial ring $F_p[t]$ is referred to as a solution of the equation X(x,y)=0. When X(x,y) is regarded as a polynomial, the solution of the equation X(x,y)=0 is referred to as a zero-point of X(x,y).

Approximate GCD Calculation for Univariable Polynomial

It is assumed that polynomials $f_1(t)=s(t)e_1(t)$ and $f_2(t)=s(t)e_2(t)$ of a univariable polynomial ring $F_p[t]$ are given.

At this time, when $e'(t):=GCD(e_1(t), e_2(t))$, the greatest common divisor (GCD) s(t)e'(t) of $f_1(t)$ and $f_2(t)$ is obtained by Euclidean tautomerism. Here, calculation (approximate GCD calculation) for deriving GCDs(t)e'(t) from the following formula (12) in which small-degree noises $a_1(t)$ and $a_2(t)$ are respectively added to $f_1(t)$ and $f_2(t)$ will be described.

$$\begin{cases} f_1(t) = s(t)e_1(t) + a_1(t) \\ f_2(t) = s(t)e_2(t) + a_2(t) \end{cases} \tag{12}$$

This calculation plays an important role in decryption of the encryption scheme illustrated in the present embodiment. It is known that GCDs(t)e'(t) can be obtained by Algorithm 1 illustrated in FIG. 1 when the condition of the following formula (13) is satisfied in the formula (12).

$$\begin{cases} \deg s(t)e'(t) \ge 2 \deg e_k(t)/e'(t) \\ \deg e_k(t)/e'(t) > \deg a_k(t) \end{cases} (k = 1, 2) \tag{13}$$

Since the algorithm illustrated in FIG. 1 uses the Euclidean algorithm, efficient processing is possible. In the present embodiment, s(t)e'(t) is referred to as approximate greatest common divisor (GCD) of $f_1(t)$ and $f_2(t)$. Here, n is a system parameter and is a natural number equal to or larger than $\deg GCD(e_1(t), e_2(t))$. If $n<\deg GCD(e_1(t), e_2(t))$, the approximate GCD calculation fails.

Ideal Decomposition of Multivariable Polynomial

A factorization (ideal decomposition) problem using an ideal in the multivariable polynomial ring $F_p[t][x,y]$ will be defined, and one solution algorithm thereof will be described. The ideal decomposition is a problem of obtaining $h_j(\epsilon F_p[t][x,y])$ (j=1, . . . , n) when two elements X and f $(=\tau_{j=1}{}^n h_j + X_r)$ of $F_p[t][x,y]$ are given. Here, r is also an element of $F_p[t][x,y]$, and is a so-called factorization problem of the polynomial f in the remainder ring $F_p[t][x,y]/(X)$.

A finite set of the multivariable polynomial ring $F_p[t][x,y]$ is referred to as $G=\{g_1, \ldots, g_s\}$. At this time, it is known that a polynomial $q_i(h_j(\epsilon F_p[t][x,y])$ exists for an arbitrary polynomial $f(\epsilon F_p[t][x,y])$, and LM(r) is not dividable by $LM(g_i)$ for r=0 or an arbitrary i in the following formula (14).

$$r = f - \sum_{i=1}^{s} q_i g_i \tag{14}$$

Here, $LM(g_i)$ and LM(r) mean monomials that come first in the monomial order defined in the multivariable polynomial ring $F_p[t]$. For example, when the order of x>y>t is defined, the degree of monomials is prioritized in the degree of x, y, and t, and in the case of monomials containing the same variables, those having higher exponents come first in this order. When the polynomial of the formula (9) is r, the monomial degree of r is $t^2x^2$, $2tx^2$, $6x^2$, $4t^2x$, x, $3ty^2$, $5y^2$, $4t^2$, t, 3, and $LM(r)=t^2x^2$.

Using the finite set G, transforming f as in the above-described formula (14) is referred to as normalization of f by G, and r is referred to as a normal form of G and written as $NE_G(f)$. In addition, when the set G is set to a set called a Groebner basis for the ideal J of a polynomial, a normal form of an arbitrary element f included in the ideal J becomes 0. That is, it is known that it can be written as in the following formula (15).

$$f - \sum_{i=1}^{s} q_i g_i = 0 \tag{15}$$

Here, $q_i$ is an element of $F_p[t][x,y]$.

It is known that the following formula (16) is obtained by calculating a termination formula of f and X.

$$\begin{aligned} Res_x(f, X) &= Res_x\left(\prod_{\kappa=1}^{n} h_\kappa + Xr, X\right) \\ &= Res_x\left(\prod_{\kappa=1}^{n} h_\kappa, X\right) = \prod_{\kappa=1}^{n} Res_x(h_\kappa, X) \end{aligned} \tag{16}$$

Here, $Res_x(f, X)$ is a termination formula relating to a variable x. Here, also for the variable y, the termination formula can be similarly calculated by the following formula (17).

$$Res_y(f, X) = \prod_{\kappa=1}^{n} Res_y(h_\kappa, X) \tag{17}$$

Here, the ideal J is defined by the following formula (18).

$$J = (X, Res_x(h_j, X), Res_y(h_j, X)) \tag{18}$$

Since J substantially matches $(h_j, X)$ and $h_j \epsilon J$, the Groebner basis G of the ideal J is calculated, and a normal form of $h_j$ under G is calculated to be 0. Here, $h_j$ is simply written as h for the sake of simplicity, and h is represented by the following formula (19).

$$h = \sum_{(i,j,k) \in \Delta_h} \mu_{ijk} x^i y^j t^k \tag{19}$$

Here, $\mu_{ijk}$ is a variable having $F_p$ as a value. When the normal form of h in G is calculated, the following formula (20) is obtained.

$$NF_G(h) = \sum_{(i,j,k) \in \Delta_h} \mu_{ijk} NF_G(x^i y^j t^k) = 0 \tag{20}$$

"h" can be restored by deriving simultaneous linear equations by comparing the coefficients of $x^i y^i t^k$ on both sides and solving the equations to obtain $\mu_{ijk}$.

On the other hand, actually, $Res_x(h_i, X)$ and $Res_y(h_i, X)$ are factors of $Res_x(f, X)$ and $Res_y(f, X)$, respectively, and $h_i$ is not restored unless they are a correct combination. Considering those points, it can be seen that the ideal decomposition is realized by Algorithm 2 illustrated in FIG. 2.

Indeterminate Equation and its Solving Problem A pair of elements $(u_x(t), u_y(t))$ on the univariable polynomial ring $F_p[t]$ satisfying the equation X(x,y)=0 on the univariable polynomial ring $F_p[t]$ is referred to as a solution of the equation X(x,y)=0. Furthermore, when X(x,y) is regarded as a polynomial, the solution of the equation X(x,y)=0 is referred to as a zero-point of X(x,y).

The indeterminate equation can be defined as an equation in which the number of variables is larger than the number of equations (included in the equation). Since an indeterminate equation has a small number of constraints and a high degree of freedom of solution, if the indeterminate equation has a solution, there are a plurality of (in some cases, finite) solutions in many cases (this means "indeterminate"). Actually, there are an infinite number of real solutions (or complex solutions) of the indeterminate equation with integer coefficients, and it is easy to obtain some of them as approximate solutions. On the other hand, such a method cannot be usually used for an equation having a solution in a discrete set such as an integer solution of an indeterminate equation with integer coefficients. Therefore, although some theoretical narrowing is required, it is known that, in general, the presence or absence of a solution cannot be determined by a finite number of steps even if such narrowing is performed (unsolvable problem).

The indeterminate equation cryptography proposed in the embodiment is based on a solving problem for obtaining a univariable polynomial solution of the indeterminate equation X(x,y)=0 defined on the univariable polynomial ring $F_p[t]$, and this problem is defined as follows.

Definition 1 (Solving Problem of Indeterminate Equation on Univariable Polynomial Ring $F_p[t]$)

When the indeterminate equation X(x,y)=0 defined on the univariable polynomial ring $F_p[t]$ is given, the problem of obtaining the solution ($u_x(t)$, $u_y(t)$) on $F_p[t]$ is referred to as a solving problem of the indeterminate equation on the univariable polynomial ring $F_p[t]$ or a solving problem on the algebraic surface X(x,y) defined on the finite field $F_p$.

This problem is also a problem that has been illustrated to be an unsolvable problem. On the other hand, in the case of being used for encryption, the degree of the univariable polynomials $u_x(t)$, $u_y(t)$ is limited to a finite degree, but in this case, simultaneous equations can be made with the coefficients of $u_x(t)$, $u_y(t)$ as variables. That is, a given indeterminate equation X(x,y) is defined as the following formula (21):

$$X(x, y) \sum_{(i,j,k)\in\Delta_X} \tau_{i,j,k} \cdot x^i y^j t^k = 0 \tag{21}$$

the degree of each element of section ($u_x(t)$, $u_y(t)$, t) is assumed as follows:

$\deg u_x(t)=\deg u_y(t)=d$, and the following formulas (22) and (23) are set, and $$u_x(t) = \alpha_0 + \alpha_1 t + \ldots + \alpha_d t^d \tag{22}$$

$$u_y(t) = \beta_0 + \beta_1 t + \ldots + \beta_d t^d \tag{23}$$

By substituting this into X(x,y,t)=0, the following relational expression (24) is obtained.

$$\sum_{i=0}^{2d+d_X} c_i(\alpha_0, \ldots, \alpha_d, \beta_0, \ldots, \beta_d) t^i = 0 \tag{24}$$

Here, it is assumed that coefficients of respective terms of the indeterminate equation X(x,y) have the same degree, and are expressed as dx. Since t is an indeterminate element in Equation (24), a system of simultaneous equations of the following formula (25) is obtained by comparing coefficients of both sides.

$$\begin{cases} c_0(\alpha_0, \ldots, \alpha_d, \beta_0, \ldots, \beta_d) & = 0 \\ c_1(\alpha_0, \ldots, \alpha_d, \beta_0, \ldots, \beta_d) & = 0 \\ \vdots & \\ c_{2d+d_X}(\alpha_0, \ldots, \alpha_d, \beta_0, \ldots, \beta_d) & = 0 \end{cases} \tag{25}$$

If X(x,y) is a nonlinear polynomial, this system of simultaneous equations (25) is also nonlinear, and its degree matches the total degree of X(x,y) with respect to x and y. In the present embodiment, in order to specifically consider problems of computational hardness and security analysis, the total degree of X(x,y) is assumed to be 2. Thus, the solving problem of the indeterminate equation becomes a solving problem (MQ problem) of quadratic multivariable simultaneous equations.

The MQ problem is a computational hard problem that is the basis of the security of the multivariable public-key cryptography, and is generally an NP problem. The most efficient solution known so far is a method using Groebner basis calculation, and it is known that the worst calculation amount of the Groebner basis calculation increases in a double exponential manner. On the other hand, an average calculation amount is not known, and calculation amount analysis based on computer experiments is widely performed. Among these calculational analyses, there are the following first and second points as obtained knowledge.

1. Calculation becomes difficult when the difference between the number of formulas and the number of variables is small.

2. Calculation becomes difficult when each equation includes more terms.

Regarding the first point, in the case of the present problem, the number of variables is 2(d+1) and the number of equations is $2d+d_x+1$. Therefore, if $d_x \geq 2$, the number of equations is larger, and the difference between the number of equations and the number of variables is $d_x-1$. Here, by setting dx to a fixed value (2 or more) that does not depend on other parameters, the computational hardness of the problem is stabilized, and by setting dx to be smaller, the computational hardness is increased.

With respect to the second point, since the number of variables is 2(d+1), the number of possible terms appearing in the equation can be expressed as ${}_{2(d+1)}H_2={}_{2d+3}C_2=(2d+3)(2d+2)/2$, the number of linear terms (the term of degree 1) is 2(d+1), and that of the term of degree zero (constant term) is 1. In this solving problem, these terms are not included in all the formulas due to their configuration. On the other hand, more terms can be included in each formula, and for this purpose, the degree dx of the coefficient may be increased. However, if dx is made larger than necessary, the number of equations also increases, and as a result, the difference between the number of equations and the number of variables increases, and calculation becomes less difficult from the first point.

Therefore, in order to increase the number of terms while keeping the number of equations constant, the following formula (26) obtained by substituting (x,y)=($u_x(t)$, $u_y(t)$) into X(x,y)=0, which is the basis of the above-described formula (25), will be considered.

$$\tau_{2,0}(t)u_x(t)^2 + \tau_{1,1,}(t)u_x(t)u_y(t) + \tau_{0,2}(t)u_y(t)^2 + \tau_{1,0}(t)u_x(t) + \tau_{0,1}(t)u_y(t) + \tau_{0,0}(t) = 0 \tag{26}$$

Equation (25) described above is obtained by substituting equations including the variables defined in Equations (22) and (23) described above into $u_x(t)$, $u_y(t)$ and comparing coefficients of both sides. Here, assuming that $\deg\tau_{i,j}(t)$ ($0 \leq i, j \leq 2$) is constant regardless of i and j, the number of equations is determined by quadratic terms, and becomes $2d+\deg\tau_{i,j}(t)$ (i+j=2).

On the other hand, the quadratic terms appearing in the above-described formula (25) are derived from the quadratic terms such as $\tau_{2,0}(t)u_x(t)^2$, $\tau_{1,1}(t)u_x(t)u_y(t)$, $\tau_{0,2}(t)u_y(t)^2$ in the above-described formula (26), the linear terms are derived from the linear terms such as $\tau_{1,0}(t)u_x(t)$, $\tau_{0,1}(t)u_y(t)$ in the above-described formula (26), and the constant term is derived from only the constant term $\tau_{0,0}(t)$ in the above-described formula (26). Therefore, in order to increase the number of terms without increasing the number of equations, a method of increasing the degree of the coefficients $\tau_{i,j}(t)$ (i+j=0, 1) of the terms other than the quadratic can be considered. On the other hand, in order not to increase the number of equations even when the degree is increased, it is necessary to set the maximum $d+\deg\tau_{2,0}(t)$ in the linear terms and the maximum $2d+\deg\tau_{2,0}(t)$ in the constant term.

Therefore, focusing on the total degree (total degree for x,y) of the terms included in the polynomial X(x,y) and defining the degree of the coefficients of the terms of the total degree ν as $d_{X,ν}$, it can be seen that it is preferable that $$d_{X,2} = \text{constant},\ d_{X,1} = d + d_{X,2},\ d_{X,0} = 2d + d_{X,2}.$$

Here, the configuration that satisfies both of the two requirements obtained from the knowledge of the computational hardness of the MQ problem has been discussed, but the two characteristics may contradict each other. That is, when the number of equations and the number of variables are brought close to each other, the constraint of the variables by the equations is reduced, so that a plurality of solutions are likely to occur, and accordingly, the Groebner basis becomes complicated, and the complexity of calculation for finding the Groebner basis increases. However, when the number of terms included in the formula is further increased, the constraint by the variable increases, and the number of solutions decreases, so that the Groebner basis becomes simple, and the complexity of calculation for finding the Groebner basis decreases. In addition, since the maximum complexity of calculation for finding the Groebner basis varies depending on the size of the finite field, it is important to determine by focusing on the total degree (total degree for x, y) of the terms included in the polynomial X(x,y) while considering other parameters.

Hereinafter, an example of the indeterminate equation cryptography of the present embodiment will be described. In addition, in the following algorithm, a small numerical example is added for the purpose of assisting understanding, but it should be noted that security of cryptography cannot be maintained in this numerical example. In addition, in the present embodiment, the indeterminate equation X(x,y) which is a public key and the random polynomial s(x,y) are symmetric equations with respect to x and y, but it is indicated by [Variations in which indeterminate equation X(x,y) is not used as symmetric equation] described later that the present embodiment holds even if the formulas are not symmetric equations.

Parameters

Symbols and parameters used in the method of the present embodiment will be described. The following symbols are defined for the bivariable polynomial ξ(x,y) on $\mathbb{F}_p[t]$.

$D_ξ$: Total degree with respect to x, y of ξ(x,y)

$d_{ξ,ν}$: Degree of coefficient polynomial of (the total degree of a polynomial of x and y) νth-degree term of ξ(x,y)

In the method of the present embodiment, a bivariable polynomial on five polynomials $\mathbb{F}_p[t]$ illustrated in the following formula (27) is used.

$$X(x, y), m(x, y), s(x, y), e(x, y), r(x, y) \in \mathbb{F}_p[t][x, y]. \tag{27}$$

Among them, X(x,y) is a polynomial having $(u_x(t), u_y(t))$ as a zero-point, the zero-point satisfies $\deg u_x(t)=\deg u_y(t)$, and this degree is written as d. The parameters of the cryptography of the present embodiment are p, d, $D_ξ$, and $d_{ξ,ν}$(ξ=X, m, s, e, r, ν=0, . . . , $D_ξ$). Here, $d_{ξ,ν}$ will be described with an example. Assuming that the bivariable polynomial ξ(x,y) is the following formula (28), $D_ξ=2$, and $d_{ξ,2}=1$, $d_{ξ,1}=2$, $d_{ξ,0}=4$.

$$\xi(x, y) = (2t+1)x^2 + (3t+2)xy + (t+4)y^2 + (t^2+2t+3)x + (4t^2+t+2)y + 3t^4 + 2t^3 + t^2 + 2t + 4 \tag{28}$$

When $d_{ξ,ν}$ is constant regardless of the value of ν, that is, when $d_{ξ,0}= \ldots =d_{ξ,D_ξ}$, $d_{ξ,ν}$ is simply expressed as $d_ξ$. In the present embodiment, $d_{ξ,ν}$ is written only when ξ=X, s.

Hereinafter, a condition of the following formula (29) is assumed for decryption.

$$\begin{cases} D_s d + d_{s,2} \geq 2(D_e d + d_e) \\ D_e d + d_e > D_m d + d_m \\ d \geq 3(d_m + 1) \end{cases} \tag{29}$$

In the present embodiment, since $D_m=3$, $D_x=D_s=2$, $D_e=D_r=1$, the condition of the above-described formula (29) is the following formula (30).

$$\begin{cases} d_{s,2} \geq 2d_e \\ d + d_e > 3d + d_m \\ d \geq 3(d_m + 1) \end{cases} \tag{30}$$

Key Generation Algorithm

In the key generation of the scheme of the present embodiment, p, d and $d_{x,ν}$ (ν=0, 1, 2) among the above-described parameters are used as inputs. Among these parameters, p, d and $d_{x,2}$ are parameters directly related to security of encryption, and are determined on the basis of the amount of calculation required for an attack technique described in [Examination of security] described later. In the numerical example, p=7 and dm=1 are set, and from these, d=3 $(d_m+1)$=6 is set according to a determination method indicated in [Parameter determination method] described later. In addition, $d_{x,ν}$ (ν=1, 2) is set by the following formula (31).

$$d_{X,2} = 2,\ d_{X,1} = d - 1,\ d_{X,0} = 2d - 1 \tag{31}$$

Therefore, in the numerical example, dx, 1=5 and $d_{x,0}$=11.

1. Generation of Private Key

Two d-degree polynomials $u_x(t)$, $u_y(t)$ of the polynomial ring $\mathbb{F}_p[t]$ are generated uniformly at random, and, for example, a private key $(x,y)=(u_x(t), u_y(t))$ of the following formula (32) is generated.

$$(u_x(t), u_y(t)) = (t^6 + t^4 + 3t + 5,\ t^6 + 2t^5 + 3t^4 + t^3 + t + 4) \tag{32}$$

2. Generation of Coefficients of Public Key

A $d_{X,ν}$-degree polynomial $τ_{i,j}(t)$ (i+j=ν, ν=1, 2) that is a coefficient other than a constant term of the public key X(x,y) is generated uniformly at random. Here, it is assumed that $τ_{i,j}(t)=τ_{j,i}(t)$ so that X(x,y) is a symmetric equation. Here, since $d_{x,2}$=2 and $d_{x,1}$=5, it is generated as the following formula (33).

$$\tau_{2,0}(t) = \tau_{0,2}(t) = 3t^2 + t + 2 \tag{33}$$

$$\tau_{1,1}(t) = 6t^2 + 2t + 1$$

$$\tau_{1,0}(t) = \tau_{0,1}(t) = 3t^5 + 4t^4 + 5t^3 + 2t^2 + t + 4$$

3. Calculation of Provisional Constant Term of Public Key

A provisional constant term of the public key is calculated by the following formula (34).

$$\widetilde{\tau_{0,0}}(t) := -\sum_{1\le i+j\le 2} \tau_{i,j}(t)\cdot u_x(t)^i u_y(t)^i \tag{34}$$

Specifically, in the above-described example, it is calculated by the following formula (35).

$$\widetilde{\tau_{0,0}}(t) := 5t^{14} + 3t^{12} + 5t^{11} + 3t^{10} + 6t^9 + 2t^8 + 5t^7 + 5t^6 + 2t^5 + 6t^4 + 3t^3 + 2t^2 + 2t + 6 \tag{35}$$

Here, when X(x,y) is defined by the following formula (36), ($u_x$(t), $u_y$(t)) is the solution of X(x,y)=0.

$$X(x, y) := X(x, y) + \widetilde{\tau_{0,0}}(t) = 0 \tag{36}$$

On the other hand, since the provisional constant term in the above-described formula (34) has the degree of 2d+$d_{X,2}$ and is larger than $d_{X,0}$=2d−1, the following coefficient adjustment is performed.

4. Adjustment of Degree of Coefficient

When a quotient obtained by dividing the provisional constant term of the above-described formula (34) by $u_x$(t) $u_y$(t) is q(t), the following formula (37) also has the same ($u_x$(t), $u_y$(t)) as a solution.

$$X(x, y) + q(t)xy - q(t)u_x(t)u_y(t) = 0 \tag{37}$$

Here, degq(t)=$d_{X,2}$. The constant term is expressed by the following formula (38).

$$\widetilde{\tau_{0,0}}(t) - q(t)u_x(t)u_y(t) \tag{38}$$

This agrees with the following formula (39), and thus the degree is 2d−1 or less.

$$\widetilde{\tau_{0,0}}(t) \bmod u_x(t)u_y(t) \tag{39}$$

Therefore, this modification also satisfies the requirement of the degree of each term. Therefore, by updating X(x,y) to the following formula (40), deg$\tau_{0,0}$(t)=2d−1=$d_{X,0}$ is obtained, and conversion into an indeterminate equation satisfying the conditions of the public key can be performed.

$$X(x, y) := X(x, y) + q(t)xy - q(t)u_x(t)u_y(t) \tag{40}$$

In this example, q(t) is expressed by the following formula (41), and $\tau_{1,1}$(t) and $\tau_{0,0}$(t) are converted into the following formula (42), so that the public key X is updated to the following formula (43). The degree of the constant term is $d_{X,0}$=11.

$$q(t) = 5t^2 + 4t + 3 \tag{41}$$

$$\tau_{11}(t) = t^2 + 5t + 5 \tag{42}$$

$$\tau_{00}(t) = 4t^{11} + t^{10} + 5t^9 + 4t^8 + 2t^7 + 6t^6 + 4t^5 + t^4 + 5t^3 + 6t^2 + 2t + 6$$

$$X(x, y) = (3t^2 + t + 2)x^2 + (t^2 + 5t + 5)xy + (3t^2 + t + 2)y^2 + (3t^5 + 4t^4 + 5t^3 + 2t^2 + t + 4)x + (3t^5 + 4t^4 + 5t^3 + 2t^2 + t + 4)y + 4t^{11} + t^{10} + 5t^9 + 4t^8 + 2t^7 + 6t^6 + 4t^5 + t^4 + 5t^3 + 6t^2 + 2t + 6 \tag{43}$$

Here, the term xy of which the coefficients are changed is a term in which x and y are symmetric, and there is no change in that X(x,y) is a symmetric equation even if the degree of the coefficient is adjusted.

With this algorithm, it is possible to generate uniformly at random the polynomial X(x,y) satisfying the parameters p, d and $d_{x,2}$ and the condition of the following formula (44).

$$\begin{cases} \text{Have zero-point } (u_x(t), u_y(t)) \\ d_{X,1} = d - 1,\ d_{X,0} = 2d - 1 \end{cases} \tag{44}$$

Encryption Algorithm

Next, an encryption algorithm will be described. In the present embodiment, a plaintext M (message M) is 7-ary expanded as follows.

$(566325223226651055 54)_7$

Then, the 7-ary expanded plaintext M is embedded in a coefficient of a plaintext polynomial m(x,y) satisfying the following formula (45).

$$deg_{x,y}m(x, y) = 3,\ deg_t m(x, y) = d_m \tag{45}$$

Here, when it is noted that $D_m$=3 and $d_m$=1, the 7-ary expanded plaintext M is embedded as in the following formula (46).

$$m(x, y) = (5t + 6)x^3 + (6t + 3)x^2y + (2t + 5)xy^2 + (2t + 2)y^3 + (3t + 2)x^2 + (2t + 6)xy + (6t + 5)y^2 + tx + (5t + 5)y + 5t + 4 \tag{46}$$

This plaintext polynomial m(x,y) is encrypted as follows.

1. Generation of Polynomial s(x,y)

A $d_{s,\nu}$-degree polynomial $s_{i,j}$(t) (i+j=ν, ν=0, 1, 2), which is a coefficient of the polynomial s(x,y) is generated uniformly at random. Note that it is assumed that $s_{i,j}$(t)=$s_{j,i}$(t) so that s(x,y) is symmetric. Here, $d_{s,1}$, $d_{s,0}$ is expressed by the following formula (47).

$$d_{s,1} = d_{s,2} - d_{x,2} + d - 1,\ d_{s,0} = d + d_{s,1} \tag{47}$$

Here, $d_{s,2}$=28, $d_{s,1}$=31, $d_{s,0}$=37, respectively. In this example, s(x,y) is generated as in the following formula (48).

$$s(x, y) = \tag{48}$$

$$(2t^{28} + 5t^{27} + 3t^{26} + 3t^{25} + 4t^{24} + 5t^{23} + 6t^{22} + 3t^{21} + t^{20} + 3t^{19} +$$

-continued $$4t^{18} + t^{17} + t^{15} + 4t^{14} + t^{13} + 5t^{12} + 3t^{11} + t^{10} + 6t^9 + t^8 + 4t^6 + 5t^4 + 4t^2 + t + 2)x^2 + (2t^{28} + 4t^{27} + 3t^{25} + 2t^{24} + 3t^{22} + 3t^{21} + 3t^{18} + 6t^{17} + 6t^{16} + 2t^{15} + 4t^{14} + 6t^{13} + 4t^{12} + 5t^{11} + t^{10} + 3t^9 + 6t^7 + 3t^6 + 2t^5 + 2t^4 + 5t^3 + 5t^2 + t + 4) xy + (2t^{28} + 5t^{27} + 3t^{26} + 3t^{25} + 4t^{24} + 5t^{23} + 6t^{22} + 3t^{21} + t^{20} + 3t^{19} + 4t^{18} + t^{17} + t^{15} + 4t^{14} + t^{13} + 5t^{12} + 3t^{11} + t^{10} + 6t^9 + t^8 + 4t^6 + 5t^4 + 4t^2 + t + 2)y^2 + (4t^{31} + 2t^{30} + t^{29} + t^{28} + 6t^{27} + 4t^{26} + 4t^{25} + t^{24} + 6t^{23} + 5t^{22} + 6t^{20} + 3t^{19} + 6t^{18} + 2t^{17} + 2t^{16} + t^{15} + 6t^{14} + 6t^{13} + 3t^{12} + 3t^{11} + 5t^{10} + 5t^9 + 5t^7 + 3t^6 + 6t^5 + 3t^4 + 5t^3 + 6t^2 + 5t + 4)x + (4t^{31} + 2t^{30} + t^{29} + t^{28} + 6t^{27} + 4t^{26} + 4t^{25} + t^{24} + 6t^{23} + 5t^{22} + 6t^{20} + 3t^{19} + 6t^{18} + 2t^{17} + 2t^{16} + t^{15} + 6t^{14} + 6t^{13} + 3t^{12} + 3t^{11} + 5t^{10} + 5t^9 + 5t^7 + 3t^6 + 6t^5 + 3t^4 + 5t^3 + 6t^2 + 5t + 4)y + t^{37} + 6t^{36} + 4t^{34} + 6t^{33} + 3t^{32} + 4t^{31} + 4t^{30} + 3t^{28} + t^{27} + 2t^{26} + 6t^{24} + 3t^{23} + 4t^{22} + 2t^{21} + 5t^{20} + 3t^{19} + 5t^{18} + 5t^{17} + 3t^{16} + 2t^{15} + 2t^{13} + 4t^{12} + 3t^{11} + 5t^{10} + 5t^9 + 3t^8 + 6t^7 + t^6 + 6t^5 + 6t^4 + 5t^3 + 5t^2 + 3t + 2$$

2. Generation of Noise Polynomial e(x,y)

A linear bivariable polynomial e(x,y) having coefficients of the $d_e$-degree or less is generated. In this example, when $d_e$=14, e(x,y) is generated as in the following formula (49).

$$e(x, y) = (4t^{14} + 5t^{13} + 6t^{12} + 4t^{10} + 2t^9 + 2t^8 + 3t^7 + t^6 + 4t^5 + 6t^4 + t^3 + 6t^2 + 4t + 5)x + (5t^{14} + t^{13} + 2t^{12} + 3t^{11} + 3t^{10} + 3t^9 + t^8 + 6t^7 + 3t^6 + 4t^5 + 3t^4 + 3t^3 + 5t^2)y + 6t^{14} + 6t^{13} + 3t^{12} + t^{11} + 3t^{10} + 3t^9 + 5t^8 + 2t^6 + 3t^5 + 2t^4 + 6t^3 + t + 6 \quad (49)$$

3. Generation of Random Polynomial r(x,y)

A linear bivariable random polynomial r(x,y) having a coefficient of the $d_r$-degree or less is generated. In this example, when $d_r$=40, r(x,y) is generated as in the following formula (50).

$$r*(x, y) = (5t^{40} + 6t^{39} + 2t^{38} + 3t^{37} + 6t^{36} + 6t^{35} + 3t^{33} + 3t^{32} + 6t^{31} + 4t^{30} + t^{29} + 4t^{28} + 3t^{27} + 6t^{26} + 5t^{25} + 4t^{24} + 4t^{23} + 3t^{22} + 6t^{21} + 6t^{20} + 6t^{19} + 6t^{17} + 3t^{16} + 3t^{15} + 6t^{14} + 5t^{13} + 3t^{12} + 6t^{10} + 4t^9 + t^8 + t^6 + 2t^5 + 2t^4 + 3t^3 + 3t^2 + 4t + 5)x + (t^{40} + t^{39} + Gt^{35} + 4t^{34} + 5t^{33} + 2t^{31} + 6t^{30} + 4t^{28} + t^{27} + 3t^{26} + 2t^{25} + 3t^{24} + 5t^{23} + 2t^{22} + 4t^{21} + 4t^{20} + 5t^{19} + 5t^{17} + t^{16} + 4t^{15} + 4t^{14} + Gt^{13} + 5t^{10} + 5t^9 + 5t^8 + 6t^7 + 2t^6 + 4t^5 + t^4 + 5t^2 + 5t + 2)y + t^{40} + 5t^{38} + 2t^{37} + 4t^{36} + 3t^{35} + 4t^{33} + 5t^{31} + 3t^{30} + t^{29} + 2t^{28} + 6t^{27} + 4t^{26} + 2t^{25} + 2t^{23} + 3t^{23} + \quad (50)$$

-continued $$t^{22} + 3t^{21} + 4t^{20} + 5t^{19} + t^{18} + 4t^{17} + t^{16} + 5t^{15} + 3t^{14} + 3t^{13} + 5t^{12} + 6t^{11} + 3t^{10} + t^9 + 5t^8 + 2t^7 + 5t^6 + 2t^5 + 3t^4 + 3t^3 + 3t^2 + 1$$

4. Generation of Ciphertext c(x,y)

The ciphertext is calculated by the following formula (51).

$$c(x, y) = s(x, y)e(x, y) + X(x, y)r(x, y) + m(x, y) \quad (51)$$

In this example, c(x,y) is calculated as in the following formula (52).

$$c(x, y) = (2t^{42} + 4t^{41} + t^{40} + 3t^{39} + 5t^{38} + 5t^{36} + t^{35} + 6t^{33} + 5t^{30} + 3t^{29} + 2t^{28} + 5t^{27} + 6t^{26} + 4t^{25} + 3t^{24} + 4t^{23} + t^{20} + 3t^{19} + 4t^{18} + 5t^{17} + 6t^{16} + 3t^{15} + 4t^{14} + 2t^{13} + 2t^{12} + 5t^{11} + 3t^{10} + t^9 + 5t^8 + 2t^7 + 6t^6 + 4t^5 + t^4 + 3t^3 + 5t^2 + 3t + 5)x^3 + (5t^{42} + 3t^{41} + 6t^{40} + 3t^{36} + 5t^{34} + 6t^{32} + 3t^{31} + 4t^{30} + 4t^{29} + 2t^{28} + 4t^{27} + t^{26} + 2t^{25} + 4t^{24} + 6t^{23} + 2t^{22} + t^{21} + 3t^{19} + 4t^{17} + 4t^{16} + 4t^{15} + 2t^{14} + 3t^{13} + t^{11} + 3t^{10} + t^9 + 2t^7 + 6t^6 + 4t^5 + 5t^4 + t^3 + 5t^2 + 3)x^2 y + (6t^{42} + 6t^{41} + t^{40} + 5t^{39} + t^{38} + 4t^{37} + 4t^{36} + t^{34} + 4t^{31} + 5t^{27} + 4t^{26} + 6t^{25} + 6t^{24} + 5t^{23} + 4t^{22} + 2t^{21} + 5t^{19} + t^{18} + 2t^{17} + 4t^{16} + 5t^{15} + 5t^{14} + 2t^{13} + 4t^{12} + 2t^{10} + t^8 + 5t^7 + 2t^6 + 4t^5 + 2t^4 + t^3)xy^2 + (6t^{42} + 2t^{41} + t^{40} + 5t^{39} + t^{38} + 6t^{37} + 5t^{36} + 4t^{35} + 3t^{34} + t^{33} + 4t^{32} + t^{30} + 4t^{29} + 2t^{28} + 2t^{27} + 2t^{25} + 6t^{24} + 5t^{23} + 6t^{21} + 3t^{20} + t^{19} + 3t^{18} + 6t^{17} + 3t^{16} + 4t^{15} + 4t^{14} + 2t^{13} + t^{11} + 5t^{10} + 5t^9 + 2t^7 + 2t^6 + 4t^5 + 3t^3 + 3t^2 + 6)y^3 + (3t^{45} + 3t^{44} + 2t^{43} + 2t^{42} + 4t^{41} + 2t^{40} + t^{38} + t^{37} + 5t^{35} + 3t^{34} + 5t^{33} + 2t^{32} + 5t^{31} + 3t^{30} + 5t^{29} + 2t^{28} + 4t^{27} + 4t^{26} + 3t^{25} + 5t^{23} + 5t^{22} + 4t^{21} + 4t^{20} + 6t^{18} + 6t^{17} + 2t^{16} + 2t^{15} + 3t^{14} + 6t^{12} + 6t^{11} + 3t^{10} + 3t^9 + 2t^8 + t^7 + t^5 + 5t^4 + 2t^3 + t^2 + 4t)x^2 + (5t^{45} + 2t^{44} + 6t^{43} + 4t^{42} + 4t^{41} + 3t^{40} + 4t^{39} + 3t^{38} + 6t^{37} + 2t^{36} + 2t^{35} + 3t^{34} + 5t^{33} + t^{32} + 6t^{31} + t^{30} + 4t^{29} + t^{28} + 5t^{27} + 4t^{26} + 6t^{23} + 3t^{22} + 3t^{21} + 4t^{20} + 2t^{19} + 2t^{17} + t^{16} + 4t^{15} + t^{14} + t^{13} + 4t^{12} + 4t^{11} + t^{10} + 3t^9 + 6t^8 + 3t^6 + t^5 + 3t^4 + 2t^3 + 3t + 6)xy + (2t^{45} + 6t^{44} + 4^{43} + 5t^{42} + 3t^{41} + 5t^{40} + 3t^{39} + 4t^{38} + t^{37} + 2t^{36} + 4t^{35} + 6t^{32} + 5t^{31} + t^{30} + 2t^{29} + 4t^{27} + 6t^{26} + 3t^{25} + 2t^{24} + 4t^{23} + t^{22} + 3t^{21} + 4t^{19} + 5t^{18} + 6t^{15} + 4t^{14} + 4t^{13} + 6t^{10} + 4t^9 + 5t^8 + 3t^7 + 6t^5 + t^4 + 3t^3 + 6t^2 + 2t + 6)y^2 + (3t^{51} + 2t^{50} + 5t^{49} + 4t^{48} + 5t^{46} + 6t^{45} + t^{43} + 5t^{42} + 6t^{39} + 2t^{38} + 3t^{37} + 2t^{35} + 4t^{34} + 6t^{32} + 6t^{29} + 5t^{28} + 2t^{27} + t^{26} + 4t^{24} + 4t^{22} + 2t^{21} + 6t^{20} + 5t^{19} + 3t^{18} + 4t^{17} + 2t^{16} + 5t^{15} + 3^{14} + 5t^{12} + t^6 + 5t^5 + 4t^4 + t^3 + 6t^2 + 2t + 5)x + (2t^{51} + 2t^{50} + 2t^{49} + 5t^{48} + 6t^{47} + 2t^{46} + 4t^{45} + 4t^{44} + t^{43} + \quad (52)$$

-continued $$3t^{42} + 5t^{41} + t^{40} + t^{39} + 3t^{38} + 4t^{37} + 3t^{36} + 5t^{35} + 2t^{34} + 4t^{33} + 5t^{32} + 6t^{31} + 4t^{30} + t^{29} + 5t^{28} + t^{27} + 2t^{26} + 6t^{25} + 2t^{24} + 6t^{23} + 2t^{22} + 3t^{21} + 4t^{19} + t^{18} + 2t^{17} + t^{16} + 4t^{15} + 2t^{14} + t^{13} + 4t^{12} + 5t^{11} + 6t^{10} + 5t^{8} + 5t^{7} + 5t^{6} + t^{5} + 4t^{3} + 5t^{2} + 4t + 3)y + (3t^{51} + t^{50} + t^{49} + 4t^{48} + 2t^{47} + 6t^{46} + 6t^{45} + 5t^{44} + 6t^{43} + 3t^{42} + 6t^{41} + 5t^{40} + 6t^{39} + 2t^{38} + 2t^{37} + 2t^{35} + 3t^{34} + 2t^{33} + 3t^{31} + 3t^{30} + 4t^{28} + 2t^{27} + 3t^{26} + t^{25} + 6t^{24} + t^{23} + t^{22} + 6t^{21} + t^{20} + t^{19} + t^{18} + t^{17} + 5t^{16} + 4t^{15} + 4t^{14} + 4t^{13} + 4t^{11} + t^{10} + t^{8} + 2t^{7} + t^{6} + 6t^{5} + t^{4} + 6t^{3} + t^{2} + 6t + 1$$

Decryption Algorithm

Note that there is a relationship of $X(u_x(t), u_y(t))=0$ when the minimum solution u: $(x,y)=(u_x(t), u_y(t))$ is substituted into the indeterminate equation X(x,y). The decryption algorithm is as follows:

1. Substitution of Solution u into Ciphertext c(x,y) and its Inverse Expression c(y,x)

The following formula (53) is obtained by substituting the solution u into c(x,y) and c(y,x).

$$\begin{cases} c(u_x(t), u_y(t)) = s(u_x(t), u_y(t))e(u_x(t), u_y(t)) + m(u_x(t), u_y(t)) \\ c(u_y(t), u_x(t)) = s(u_x(t), u_y(t))e(u_y(t), u_x(t)) + m(u_u(t), u_x(t)) \end{cases} \quad (53)$$

Note that s(x,y)=s (y,x), and X(x,y)=X(y,x). In this example, $c(u_x(t), u_y(t))$ and $c(u_y(t), u_x(t))$ are calculated as in the following formula (54).

$$c(u_x(t), u_y(t)) = 5t^{60} + t^{59} + t^{58} + 5t^{57} + 4t^{56} + 3t^{54} + 5t^{53} + 6t^{51} + t^{50} + t^{49} + 2t^{48} + 6t^{47} + 4t^{46} + 4t^{45} + 4t^{44} + 6t^{43} + 5t^{42} + 2t^{40} + 4t^{39} + 3t^{38} + 2t^{37} + 5t^{36} + 3t^{35} + 6t^{34} + 5t^{33} + 3t^{32} + 6t^{31} + 2t^{30} + 3t^{29} + 3t^{28} + t^{27} + t^{26} + 6t^{25} + 3t^{24} + 6t^{23} + 3t^{20} + 6t^{19} + 2t^{18} + 3t^{17} + t^{16} + 5t^{14} + 3t^{13} + 6t^{12} + 2t^{11} + t^{10} + 4t^{9} + 5t^{8} + 2t^{7} + 4t^{6} + 2t^{5} + 6t^{4} + 4t^{3} + 5t^{2} + 4t + 2c(u_y(t), u_x(t)) = 5t^{60} + 3t^{59} + 6t^{58} + 6t^{55} + t^{53} + t^{52} + 3t^{51} + 6t^{50} + 3t^{49} + 3t^{48} + 6t^{46} + 6t^{45} + t^{43} + 4t^{42} + 2t^{41} + 5t^{38} + t^{37} + 5t^{36} + t^{35} + 6t^{34} + t^{33} + 3t^{32} + 4t^{31} + 6t^{29} + 6t^{28} + 2t^{27} + 6t^{26} + 4t^{25} + 3t^{24} + t^{23} + 4t^{22} + t^{21} + 3t^{20} + 5t^{18} + 3t^{17} + t^{16} + 6t^{15} + 4t^{14} + t^{12} + 6t^{11} + 4t^{9} + 5t^{8} + 5t^{7} + t^{6} + 6t^{5} + 4t^{4} + 4t^{3} + 2t^{2} + 6 \quad (54)$$

2. Calculation of $s(u_x(t), u_y(t))$ by Approximate GCD Calculation

This is obtained by Algorithm 1 (FIG. 1) under the condition of the above-described formula (13). In this example, calculation is performed as in the following formula (55).

$$s(u_z(t), u_y(t)) = t^{40} + 2t^{39} + 4t^{38} + 5t^{36} + 4t^{35} + t^{34} + 2t^{33} + 3t^{30} + 3t^{29} + 4t^{28} + t^{26} + 5t^{25} + 6t^{24} + 4t^{23} + 5t^{22} + 4t^{20} + 2t^{19} + 4t^{18} + 3t^{17} + 5t^{16} + t^{15} + 6t^{14} + t^{13} + 6t^{12} + 5t^{11} + 3t^{10} + 6t^{9} + 4t^{8} + t^{7} + t^{6} + t^{5} + 5t^{4} + 5t^{3} + 4t^{2} + 4t + 3, \quad (55)$$

-continued $$[4t^{19} + 3t^{18} + 5t^{16} + 2t^{15} + t^{14} + 4t^{12} + 3t^{11} + t^{9} + t^{8} + 6t^{7} + 2t^{6} + 5t^{3} + 2t^{2} + 6t + 2$$

Here, the first two conditions of the conditions of the above-described formula (30) are necessary conditions for satisfying the conditions of the above-described formula (13). The probability (decryption failure probability) that the condition of the above-described formula (30) will not be satisfied even if the condition of the above-described formula (13) is satisfied will be described later in [Decryption failure probability].

3. Calculation of $m(u_x(t), u_y(t))$ $m(u_x(t), u_y(t))$ is calculated by the following formula (56).

$$m(u_x(t), u_y(t)) = c(u_x(t), u_y(t)) \bmod s(u_x(t), u_y(t)) \quad (56)$$

In this example, $m(u_x(t), u_y(t))$ is calculated as in the following formula (57).

$$m(u_x(t), u_y(t)) = t^{19} + 6t^{18} + 3t^{16} + 4t^{15} + 2t^{14} + t^{12} + 6t^{11} + 2t^{9} + 2t^{8} + 5t^{7} + 4t^{6} + 3t^{3} + 4t^{2} + 5t + 4 \quad (57)$$

4. Calculation of Plaintext Polynomial m(x,y)

Since the plaintext polynomial m(x,y) can be written as the following formula (58), the plaintext polynomial m(x,y) can be obtained by constructing and solving a linear equation having $m_{i,j,k}$ as a variable using the relationship of the following formula (59).

$$m(x, y) = \sum_{\substack{0 \le i+j \le 3 \\ 0 \le k \le d_m}} m_{i,j,k} \cdot x^i y^j t^k \quad (58)$$

$$m(u_x, u_y(t)) = \sum_{\substack{0 \le i+j \le 3 \\ 0 \le k \le d_m}} m_{i,j,k} \cdot u_x(t)^i u_y(t)^j t^k \quad (59)$$

Here, since the number of variables is 10 $(d_m+1)$ and the number of equations is $3d+d_m+1$, a solution exists when the number of equations is larger than the number of variables, that is, when $d \ge 3$ $(d_m+1)$. This condition is the final condition of the conditions of the above-described formula (30). In this example, the plaintext polynomial m(x,y) is expressed by the following formula (60), and it can be confirmed that decryption is correctly performed.

$$m(x, y) = (5t + 6)x^3 + (6t + 3)x^2y + (2t + 5)xy^2 + (2t + 2)y^3 + (3t + 2)x^2 + (2t + 6)xy + (6t + 5)y^2 + tx + (5t + 5)y + 5t + 4 \quad (60)$$

Decryption Failure Probability

The decryption failure probability of this scheme is evaluated. Even if the two polynomials $c(u_x(t), u_y(t))$ and $c(u_y(t), u_x(t))$ generated in step 1 of the above-described decryption algorithm satisfy the condition of the above-described formula (30), this scheme may fail to decrypt because the condition of the above-described formula (13) of the approximate GCD calculation is not satisfied. In order to see this, when the condition of the formula (30) is satisfied and the condition of the formula (13) is not satisfied, one of the conditions (A) and (B) of the following formula (61) is satisfied. The possibility that these are established will be considered.

$$(A){:}\deg s(t)e'(t) < 2\deg e(t)/e'(t) \text{ or } (B){:}\deg e(t)/e' \le \deg m(r) \tag{61}$$

Here, for the sake of simplicity, $s(t):=s(u_x(t), u_y(t))$, $e'(t):=GCD(e(u_x(t), u_y(t)), e(u_y(t),u_x(t)))$, $e(t):=e(u_x(t), u_y(t))$, $m(t):=m(u_x(t), u_y(t))$ are written.

Among them, the condition (A) does not occur because the following formula (62) is established from the first condition of the conditions of the formula (30).

$$\deg s(t)e'(t) \ge \deg s(t) = 2d + d_{S,2} \ge 2(d+d_e) = 2\deg e(t) \ge 2\deg e(t)/e'(t) \tag{62}$$

Therefore, it is sufficient to consider the probability of occurrence of the condition (B), and it is sufficient to calculate the probability of occurrence of an event of dege'(t)≥$(d+d_e)-3d-d_m$. Here, assuming that the distribution of the coefficients of $e(u_x(t), u_y(t))$ and $e(u_y(t), u_x(t))$ is uniform, it is known that this probability is calculated as $p^{-N}(1-p^{-1})$ when N=dege'(t). Therefore, the decryption failure probability k is evaluated by the following formula (63).

$$\kappa \le \sum_{N=(d+d_e)-3d-d_m}^{\infty} p^{-N}(1-p^{-1}) = p^{3d+d_m-(d+d_e)} \tag{63}$$

Here, when a new parameter δ is defined by the following formula (64), the decryption failure probability κ can be written as the following formula (65), and it can be seen that the decryption failure probability decreases exponentially as the value of 830 decreases.

$$\delta = 3d + d_m - (d + d_e) \tag{64}$$

$$\kappa = p^{\delta} \tag{65}$$

Parameter Determination Method

First, a method for determining the parameter indicated by [Parameter] described above will be described. Parameters that need to be determined in implementing and operating the encryption scheme of the present embodiment are p, d, $D_\xi$, and $d_{\xi,v}$. Here, ξ is five polynomials of X, m, s, e, and r. p, d, $D_\xi$, and $d_{\xi,v}$ are determined in the following order so as to satisfy the conditions of the formulas (30) and (31) described above.

1. Determination of p, $d_m$ and $d_{x,2}$ p, $d_m$ and $d_{x,2}$ are parameters related to the security of encryption, and p and $d_m$ are determined on the basis of the evaluation of the calculation amount required for the attack method described in [Examination of security] described later.

2. Setting of d d is set to d=3 $(d_m+1)$ from the third condition of the formula (30) described above.

3. Setting of $d_x$

In the present embodiment, dx is set to $d_{x,1}=d-1$, $d_{x,0}=2d-1$ from the condition (31).

4. Setting of Parameter δ Related to Decryption Failure Probability

From the above-described formula (65), the parameter δ is set to the following formula (66).

$$\delta\lceil \kappa/|p| \rceil \tag{66}$$

Here, the right side represents a minimum integer of κ/|p| or more, and |p| represents a bit length of p.

5. Setting of $d_e$ $d_e$ is set as in the following formula (67) from the second condition of the above-described formula (30) and the definition of δ in the above-described formula (64).

$$d_e = 3d + d_m - d + \delta \tag{67}$$

6. Setting of $d_s$ $d_s$ is set as $d_{s,2}=2d_e$ from the first condition of the formula (30) described above. Along with this, $d_{s,1}=d_{s,2}+(d-1-d_{x,2})$, $d_{s,0}=d_{s,1}+d$ are set.

7. Setting of $d_r$ $d_r$ is set as $d_r=d_e+d_{s,2}-d_{X,2}$. With this setting, the condition of the following formula (68) is satisfied, and resistance to a linear algebraic attack described in [Linear algebraic attack] to be described later is generated.

$$\Delta_m \subset \Delta_{Xr} = \Delta_{se} \tag{68}$$

As described above, it is possible to generate parameters that satisfy the above-described formulas (30), (31), and (68).

Security Assumption

A security assumption that is the basis of security of the method of the present embodiment is defined. Prior to this, the set $\Delta_{n,d}$ is defined by the following formula (69).

$$\Delta_{n,d} = \{(i,j,k) \in \mathbb{N}^3 \mid 0 \le i+j \le n,\ 0 \le k \le d\} \tag{69}$$

That the polynomial ξ(x,y) has a set $\Delta_{n,d}$ as a base means that it has a monomial $x^i y^i t^k$ corresponding to each element (i, j, k) of $\Delta_{n,d}$. A set of polynomials is defined by the following formula (70).

$$\mathcal{F}(\Delta_{n,d}) = \{\text{Polynomial having set } \Delta_{n,d} \text{ as base}\} \tag{70}$$

In addition, $\Delta_X$ and $\Delta_s$ are defined as in the following formula (71).

$$\Delta_X = \{(i,j,k) \in \mathbb{N}^3 \mid 0 \le i+j \le 2,\ 0 \le k \le d_{X,v},\ v = i+j\}$$
$$\Delta_s = \{(i,j,k) \in \mathbb{N}^3 \mid 0 \le i+j \le 2,\ 0 \le k \le d_{s,v},\ v = i+j\} \tag{71}$$

At this time, a polynomial set such as the following formula (72) using the set $\Delta_X$ as a base is considered.

$$\mathcal{X}(\Delta_X, d) = \{X \in \overline{\mathcal{F}}(\Delta_X) | \exists\, u_x(t), u_y(t) \in \mathbb{F}_p[t] \text{ s.t. } deg\ u_x(t) = deg\ u_y(t) = d, X(u_x(t), u_y(t)) = 0\} \tag{72}$$

This is a polynomial set in which $\Delta_X$ having a zero-point of the degree d defined above as $F_p[t]$ is a base. Here, a set of symmetric polynomials having the set Δ as a base is expressed by the following formula (73).

$$\overline{\mathcal{F}}(\Delta) = \{\text{Symmetric polynomial having set } \Delta \text{ as base}\} \tag{73}$$

The following calculation problem is defined for a set of the following formula (74) satisfying the condition of the formula (30).

$$\overline{\mathcal{F}}(\Delta_*) = \{\text{Polynomial satisfying condition of formula (30)}\} \tag{74}$$

Definition 2 (approximate ideal decomposition problem) c is a sample from a polynomial set of the following formula (75).

$$\{se + Xr + m | s \in \overline{\mathcal{F}}(\Delta_s), r \in \mathcal{F}(\Delta_{D_r,d_r}), e \in \mathcal{F}(\Delta_{D_e,d_e}), m \in \mathcal{F}(\Delta_{D_m,d_m}), X \text{ is sample of polynomial set } x(\Delta_X, d)\} \tag{75}$$

The approximate ideal decomposition problem is a problem of obtaining s and e from a trivariable polynomial c=se+Xr+m and X given as the sample.

Further, an approximate ideal decomposition assumption is defined as follows.

The definition 3 (approximate ideal decomposition assumption) Approximate ideal decomposition assumption means that a probability of the following formula (76) is negligible for an arbitrary polynomial time algorithm A.

$$Adv_{\mathcal{A}}^{AI\text{-}FCT}(k) := Pr\left[ V = (s, e) \middle| \begin{array}{c} (p, d, \Delta_x, \Delta_s, D_m, D_r, D_e, d_m, d_r, d_e) \\ \leftarrow Gen(1^k); \\ X \stackrel{U}{\leftarrow} \mathcal{X}(\Delta_X, d); s \stackrel{U}{\leftarrow} \overline{\mathcal{F}}(\Delta_s); \\ m \stackrel{U}{\leftarrow} \mathcal{F}(\Delta_{D_m,d_m}); \\ r \leftarrow \stackrel{U}{\leftarrow} \mathcal{F}(\Delta_{D_r,d_r}); e \stackrel{U}{\leftarrow} \mathcal{F}(\Delta_{D_e,d_e}); \\ c := se + Xr + m; \\ V \leftarrow \mathcal{A}(p, d, \Delta_X, \Delta_s, D_m, D_r, D_e, \\ d_m, d_r, d_e, c) \end{array} \right] \tag{76}$$

That is, it means that the following formula (77) holds.

$$Adv_{\mathcal{A}}^{AI-FCT}(k) < \epsilon(k) \tag{77}$$

Here, k is a security parameter, and ε(k) is a function representing a negligible magnitude. The function ε(k) usually uses $\varepsilon(k)=2^{-k}$. In addition, the following theorem is established from the configuration of encryption.

Theorem 1 Under the approximate ideal decomposition assumption, the indeterminate equation cryptography Σ=(Gen, Enc, Dec) is secure in the sense of OW-CPA. That is, when there is an adversary who breaks the indeterminate equation cryptography in the sense of OW-CPA in polynomial time, there is an algorithm A that solves the approximate ideal decomposition problem in probabilistic polynomial time, and the following formula (78) holds.

$$Adv_{\Sigma\mathcal{B}}^{OW\text{-}CPA}(k) \leq Adv_{\mathcal{A}}^{AI\text{-}FCT}(k) \tag{78}$$

Proof c(x,y) is an arbitrary sample of the approximate ideal decomposition problem. It is assumed that there is an adversary who breaks the indeterminate equation cryptography Σ in terms of OW-CPA in polynomial time. At this time, a plaintext polynomial m(x,y) is obtained using the adversary, and the following formula (79) can be calculated.

$$c(x, y) - m(x, y) = s(x, y)e(x, y) + X(x, y)r(x, y) \tag{79}$$

Furthermore, these termination formulas are calculated as the following formula (80).

$$Res_x(c(x, y) - m(x, y), X(x, y))$$
$$Res_y(c(x, y) - m(x, y), X(x, y)) \tag{80}$$

s(x,y) and e(x,y) can be calculated by utilizing Algorithm 2 (ideal decomposition) in FIG. 2 described above. That is, this adversary can solve the approximate ideal decomposition problem, and the following formula (81) holds.

$$Adv_{\Sigma\mathcal{B}}^{OW\text{-}CPA}(k) \leq Adv_{\mathcal{A}}^{AI\text{-}FCT}(k) \tag{81}$$

Some variations (modifications) of the present embodiment will be described below.

Variations of Ciphertext

Although the ciphertext in the present embodiment is defined by the above-described formula (51), the encryption method and the decryption method of the embodiment are similarly established even if the ciphertext is represented by the following formula (82), and the security described in [Examination of security] to be described later is also satisfied.

$$c(x, y) = s(x, y)e(x, y) \pm X(x, y)r(x, y) \pm m(x, y) \tag{82}$$

Variations Related to Compression of Public Key X(x,y)

In the above-described embodiment, coefficients of the indeterminate equation X(x,y) which is a public key are taken uniformly at random other than constant terms, and only some of the terms (in the above-described embodiment, xy terms) are adjusted. Although the information of the private key is required for the adjustment, the term that is not adjusted remains random. Therefore, if the seed used for the generation is disclosed, a specific pseudo random number generation function, a hash function, or the like can be designated and generated. Therefore, only coefficients of the seed and the adjusted part can be disclosed, and the size of the public key is compressed. In this way, in the above-described embodiment, the public key size can be compressed by disclosing the actual coefficient only in a part of the following formula (83), and disclosing the seed (usually having a bit length of only the security parameter) in other terms.

$$X = (3t^5 + 2t^4 + t^3 + t^2 + 3t + 4)xy + 2t^{11} + 4t^{10} + 3t^9 + 4t^8 + t^7 + 2t^6 + t^5 + 2t^4 + 2t^3 + t^2 + 3t + 4 \quad (83)$$

This variation makes it possible to expand utilization to low-end devices having a small memory capacity.

Variation Regarding Coefficient of Public Key X(x,y)

In the above-described embodiment, coefficients of the indeterminate equation X(x,y) which is a public key are taken uniformly at random other than constant terms, and only some of the terms (in the above-described embodiment, xy terms) are adjusted. Here, each coefficient is an element of $F_p[t]$, and all the coefficients are not necessarily non-zero. If there is a non-zero coefficient, there is a possibility that the coefficients of some terms are always zero in X(x,y) r(x,y) of the ciphertext. In that case, in a linear algebraic attack or a coefficient comparison attack, there is a possibility that some information of the random polynomial constituting the ciphertext leaks (even if not all the information leaks) and a part of the information of the plaintext leaks therefrom. Therefore, in this variation, a method of making the coefficient of the coefficient $\tau_{ij}(t)$ of each term of the public key X(x,y) non-zero will be described.

In order to realize this, first, a range of random values when the coefficient $\tau_{ij}(t)$ is selected uniformly at random is set to 1 to p. As for the coefficients to be further adjusted, when some of the coefficients become zero as a result of the adjustment, the private key $u_x(t)$, $u_y(t)$ can be rearranged, or the seed used at the time of uniform random selection can be changed and rearranged to be non-zero.

Variations Regarding How to Take Term Set

In the above-described embodiment, the e(x,y) and r(x,y) term sets are limited to the maximum term set for the sake of simplicity (for example, $d_{e,v}$, $d_{r,v}$ are not defined). This is sufficient to effectively hide the plaintext by the polynomial having unknown coefficients, but it is not necessary since it is required that the term s(x,y) e(x,y) and the term X(x,y) r(x,y) in the ciphertext c(x,y) have the same formula form. Therefore, in order to specify the form of these expressions, $\Delta_\xi$ can be determined instead of the parameters $D_\xi$ and $d_\xi$ (here, e and r are included in $\xi$). With this setting, it is possible to realize with a term set smaller than the maximum term set, so that the sizes of the public key, the ciphertext, and the like can be suppressed.

Variations of Embedding Plaintext Information Also in s, r, and e

Although s, e, and r are not restored in the decryption algorithm, s, e, and r can be restored after obtaining the plaintext polynomial m. That is, when m(x,y) is obtained, the above-described formula (79) can be calculated, and s(x,y) and e(x,y) can be restored by applying the ideal decomposition described in [Ideal decomposition of multivariable polynomial] to the right side of the formula (79). r(x,y) can also be restored by calculating the following formula (84) from the restored s(x,y) and e(x,y).

$$(c(x, y) - m(x, y) - s(x, y)e(x, y)/X(x, y) \quad (84)$$

By doing so, the plaintext information or a part of the plaintext information can be embedded in s, e, or r. As a result, not only the bit length that can be encrypted at a time can be increased, but also the information as the authenticator can be added to realize the encryption scheme having resistance against the attack of falsifying the ciphertext. Note that, including the case of embedding in a plaintext polynomial, when embedding a plaintext, it is also possible to determine an embedding region in advance. In this case, by embedding a random value or information that is not affected even if decryption is performed in a portion that is not embedded, consistency as ciphertext can be maintained. Furthermore, even in a situation where some information leaks due to vulnerability caused by implementation such as a side-channel attack, it is possible to cope with a situation where information leakage may occur by not filling a plaintext.

Variation of Changing Degree of Approximate GCD in Approximate GCD Calculation

In the approximate GCD calculation described in [Approximate GCD calculation in univariable polynomial] of the above-described embodiment, it is necessary to designate the degree of s(u)e'(t) to be the approximate GCD. The degree is searched from degs(u) which is the minimum value of the degree of s(u)e'(t). The degree degs(u)e'(t) of the approximate GCD serving as an input for the approximate GCD calculation is $D_s d+d_s$ or more in many cases, but may be smaller than $D_s d+d_s$.

In this variation, an embodiment considering a case where $D_s d+d_s$ is smaller than $D_s d+d_s$ will be described. In order to implement this variation, the step of approximate GCD calculation in the decryption algorithm is executed by setting the degree D from a value smaller than $D_s d+d_s$. Then, in a case where the plaintext is not restored, D in FIG. 1 is gradually increased and finally increased to a value exceeding $D_s d+d_s$, and the processing is executed. In this way, it is possible to decrypt the ciphertext that has failed to be decrypted when the degree of the approximate GCD is less than degs(u).

Variations Related to Variable

In the above-described embodiment, the bivariable polynomial on $F_p[t]$ has been consistently described, but an encryption algorithm, a decryption algorithm, and a key generation algorithm are established with general n variables similarly to the present embodiment. Even if the number of variables is larger than three, if there is one indeterminate equation $X(x_1, \ldots, x_n)$, it is still an indeterminate equation, and the solving problem is computational hard. On the contrary, an increase in the number of variables often makes the problem more computational hard, and enhances the security. Therefore, not only the key size can be reduced, but also the size of the plaintext that can be embedded increases since there are many variables. On the other hand, since the coefficient to be restored increases, the system parameter needs to be changed to $d_s=n(d_m+1)$. Note that, in a case where the number of variables is three or more, the present embodiment is established as long as at least two of the variables are symmetric.

Variation of Changing Degree of Coefficient $m_{ij}(t)$ of Plaintext Polynomial for Each Term In the above-described embodiment, the degree of the coefficient $m_{ij}(t)$ of the plaintext polynomial has been uniformly simplified to $d_m$. In the processing of restoring m(x,y), processing of creating linear simultaneous equations in step 4 of the decryption algorithm illustrated in [Decryption algorithm] described above from $m(u_x(t), u_y(t))$ and solving the linear simultaneous equations is performed. At this time, in order to derive a unique solution, the number of equations needs to be equal to or larger than the number of variables. The number of equations matches the degree of a univariable polynomial $m(u_x(t), u_y(t))$.

On the other hand, the number of high-degree terms (terms with higher degree) of m(x,y) is larger than the number of low-degree terms such as $x^3$, $x^2y$, $xy^2$, $y^3$ when $D_m=3$. Therefore, regarding the degree of the coefficient at m(x,y), the number of formulas can be increased while suppressing the number of variables by lowering the degree of the coefficient of the high-degree term and increasing the degree of the coefficient of the low-degree term. Furthermore, with such a configuration, there is also an advantage that the decryption condition of the above-described formula (30) can be relaxed as compared with the case where De is uniformly determined.

Variations in which Indeterminate Equation X(x,y) is not Used as Symmetric Equation In the above-described embodiment, the indeterminate equation X(x,y), which is a public key, is a symmetric equation. In a case where the indeterminate equation X(x,y) is a symmetric equation, since there is one polynomial serving as the ciphertext, the effect of reducing the ciphertext length is high. However, since an indeterminate equation that can be taken as a public key is limited, there is a risk that the security of encryption is threatened by encryption analysis. Therefore, a variation in which the above-described embodiment is applied to JP 2022-77754 A on which the above-described embodiment is based is conceivable.

In JP 2022-77754 A, there are two plaintext polynomials m(x,y) and two random polynomials e(x,y) and r(x,y), respectively, and a ciphertext $(c_1(x,y), c_2(x,y))$ including the two polynomials is generated as in the following formula (85).

$$C_1(x, y) = s(x, y)e_1(x, y) + X(x, y)r_1(x, y) + m_1(x, y) \tag{85}$$
$$C_2(x, y) = s(x, y)e_2(x, y) + X(x, y)r_2(x, y) + m_2(x, y)$$

Here, since there are two plaintext polynomials, the plaintext M is bit-divided into two as M=M1||M2, and is embedded in $m_1(x,y)$ and $m_2(x,y)$, respectively. That is, in the case of this variation, it is possible to encrypt the plaintext twice as long as the case of the above-described embodiment. In addition, a method of generating each polynomial required for encryption is the same as that in the above-described embodiment except that s(x,y) is not limited to a symmetric expression.

In addition, also in the decryption, while the above-described embodiment obtains c(x,y) and c(y,x) by substituting the private key $(u_x(t), u_y(t))$ into $c(u_x(t), u_y(t))$ and $c(u_y(t), u_x(t))$, and performs the approximate GCD calculation from these polynomials, the above-described embodiment may be changed to obtain $c_1(u_x(t), u_y(t))$ and $c_2(u_x(t), u_y(t))$, and calculate the approximate GCD calculation from these polynomials.

Along with this, also for restoration of the plaintext, the following formula (86) is calculated on the basis of the calculated approximate GCDs$(u_x(t), u_y(t))$, and $m_1(u_x(t), u_y(t))$ and $m_2(u_x(t), u_y(t))$ are restored from $m_1(x,y)$ and $m_2(x,y)$, respectively, by the same procedure as described above.

$$m_1(u_x(t), u_y(t)) = c_1(u_x(t), u_y(t)) \bmod s(u_x(t), u_y(t)) \tag{86}$$
$$m_2(u_x(t), u_y(t)) = c_2(u_x(t), u_y(t)) \bmod s(u_x(t), u_y(t))$$

Variation Regarding Degree of Coefficient of Public Key X(x,y)

In the above-described embodiment, the degree of the coefficient of the indeterminate equation X(x,y), which is the public key, is obtained as follows by setting $d_{X,2}$ as constants from the condition (31).

$$d_{x,1} = d - 1,\ d_{x,0} = 2d - 1$$

However, as illustrated in [Indeterminate equation and its solving problem] described above, these parameters are not taken in one way, and it is necessary to determine by the total degree ν of each term in consideration of the relationship with other parameters.

In addition, as illustrated in [Indeterminate equation and its solving problem] described above, it may be determined as follows.

$$d_{x,1} = d + d_{x,2},\ d_{x,0} = 2d + d_{x,2}$$

In this way, the number of terms of the simultaneous equations appearing in the processing of solving the solving problem of the indeterminate equation can be increased, and the solving problem may be more difficult to calculate.

In this case, when $d_{s,\nu}$ is also determined as $d_{s,1}=d_{s,2}+d$, $d_{s,0}=d_{s,1}+d$, the values of $d_r=d_e d_{s,\nu}-d_{x,\nu}$ coincide with each other at all ν=0, 1, and 2, the condition of the above-described formula (68) is satisfied, and a linear algebraic attack can be avoided. Here, $d_{s,2}=2d_e$.

This is the end of the description of the variations, but since these variations are all independent, some or all of the above-described variations can be used in combination.

Specific Configuration

Next, specific configurations and operation methods of the encryption device, the decryption device, and the key generation device in the public-key cryptography of the present embodiment will be described.

First, the configuration of the encryption device according to the present exemplary embodiment and the flow of processing are illustrated along the flowchart illustrated in FIG. 4 with reference to the overall configuration diagram illustrated in FIG. 3.

An encryption device 10 according to the embodiment includes a plaintext acquisition module 1, a public-key acquisition module 2, a plaintext embedding module 3, a storage unit 4, an encryption module 5, a polynomial generation module 6, a random value generation module 7, a polynomial operation module 8, and a ciphertext output module 9.

First, the plaintext acquisition module 1 acquires a plaintext M (Step S1). The plaintext acquisition module 1 acquires, for example, encryption target data acquired from another application, another device, or the like as a plaintext M. The plaintext acquisition module 1 inputs the plaintext M acquired in Step S1 to the plaintext embedding module 3.

Next, the public-key acquisition module 2 acquires a bivariable symmetric indeterminate equation X(x,y) as a public key (Step S2). The public-key acquisition module 2 acquires a public key from another device such as a key generation device described later, for example. The public-key acquisition module 2 inputs the public key acquired in Step S2 to the encryption module 5.

Next, the plaintext embedding module 3 acquires the system parameters p, Dm, and dm from the storage unit 4, and the encryption module 5 acquires the system parameters p, $D_s$, $D_r$, $D_e$, $d_{s,v}$, $d_r$, and $d_e$ conforming to the public key acquired in Step S2 from the storage unit 4 (Step S3).

Next, the plaintext embedding module 3 divides the plaintext M input from the plaintext acquisition module 1 into 10 ($d_m$+1) subblocks of |p|−1 bits (|p| is a bit length of p). Since the plaintext polynomial is a cubic expression in the present embodiment, the plaintext embedding module 3 embeds the plaintext M divided into each sub-block in the coefficients of the bivariable plaintext polynomial m(x,y) on $F_p[t]$ of the above-described formula (58) (Step S4). Here, since the degree of each coefficient $m_{i,j}(t)$ is $d_m$ and the coefficients of these polynomials are the element of $F_p$, the block size of the encryption scheme of the present embodiment is 10 ($d_m$+1)|p|. When a larger plaintext is input, the text is first divided into this block size and then encrypted for each block. The plaintext embedding module 3 inputs the plaintext polynomial m(x,y) generated in Step S4 to the encryption module 5.

In addition, the encryption module 5 generates a coefficient corresponding to the total degree i+j of each term $x^i y^j$ in order to generate a symmetric polynomial s(x,y) of the following formula (87).

$$s(x, y) = \sum\nolimits_{(i,j)\in\Delta_s} s_{ij}(t)x^i y^j \tag{87}$$

Here, assuming that $D_s$=2, first, the degree $d_{s,2}$ of the coefficient of the quadratic terms of s(x,y) is input to the polynomial generation module 6, and generation of a random polynomial is instructed (Step S5). The polynomial generation module 6 instructs the random value generation module 7 to generate $d_{s,2}$+1 random values from 0 to p−1, embeds the value input from the random value generation module 7 in the coefficient, and generates the coefficient $s_{2,0}(t)$ of the term $x_2$. The polynomial generation module 6 inputs the generated coefficient $s_{2,0}(t)$ to the encryption module 5. The encryption module 5 stores the coefficients of the $x^2$ and $y^2$ terms in the storage unit 4.

In addition, the encryption module 5 generates the coefficient $s_{11}(t)$ of the term xy by the same means (Step S6). Next, the encryption module 5 inputs the degree $d_{s,1}$ of the coefficient of the term x to the polynomial generation module 6, and instructs generation of a random polynomial. The polynomial generation module 6 instructs the random value generation module 7 to generate $d_{s,1}$+1 random values from 0 to p−1, embeds the value input from the random value generation module 7 in the coefficient, and generates the coefficient $s_{1,0}(t)$ of the term x. The polynomial generation module 6 inputs the generated coefficient $s_{1,0}(t)$ to the encryption module 5. The encryption module 5 stores the coefficients of the x and y terms in the storage unit 4.

The encryption module 5 generates a coefficient $s_{0,0}(t)$ of the constant term by the same means (Step S7). Next, the encryption module 5 inputs the degree $d_{s,0}$ of the coefficient of the constant term to the polynomial generation module 6, and instructs generation of a random polynomial. The polynomial generation module 6 instructs the random value generation module 7 to generate $d_{s,0}$+1 random values from 0 to p−1, embeds the value input from the random value generation module 7 in the coefficient, and generates the coefficient $s_{0,0}(t)$ of the constant term. The polynomial generation module 6 inputs the generated coefficient $s_{0,0}(t)$ to the encryption module 5. The encryption module 5 stores the constant term in the storage unit 4.

As described above, the generation of the coefficient of the quadratic terms, the coefficient of the linear terms, and the constant term ($s_{i,j}(t)$ (0≤i+j≤2)) is completed. The encryption module 5 inputs $s_{i,j}(t)$ (0≤i+j≤2) to the polynomial operation module 8, and instructs generation of a bivariable symmetric polynomial s(x,y). The polynomial generation module 6 calculates the following formula (88), and inputs the calculated bivariable symmetric polynomial s(x,y) to the encryption module 5.

$$s(x, y) = \sum_{0\le i+j\le 2} s_{ij}(t)x^i y^j \tag{88}$$

Next, the encryption module 5 continuously inputs the system parameters p, $D_r$, and $d_r$ to the polynomial generation module 6, and generates a Dr-degree random polynomial r(x,y) having a uniform $d_r$-degree polynomial as a coefficient regardless of a term by the same method as the method of generating the random polynomial s(x,y) (Step S8).

Next, the encryption module 5 continuously inputs the system parameters p, Der and de to the polynomial generation module 6, and generates a De-degree random polynomial e(x,y) having a uniform de-degree polynomial as a coefficient regardless of a term by the same method as the method of generating the random polynomial s(x,y) (Step S9).

Next, the encryption module 5 calculates (generates) the ciphertext c(x,y) while causing the polynomial operation module 8 to calculate the polynomials s(x,y), r(x,y), and e(x,y), the public key X(x,y), and the plaintext polynomial factor m(x,y) every time according to the above-described formula (51) (Step S10). The encryption module 5 inputs the ciphertext c(x,y) to the ciphertext output module 9.

Finally, the ciphertext output module 9 outputs the ciphertext c(x,y) as the output of the encryption device 10 (after being deformed according to a predetermined format if necessary) (Step S11). The predetermined format is, for example, a format of binary data defined as an input format of a subsequent device or the like to which the ciphertext is input.

Figure 5:
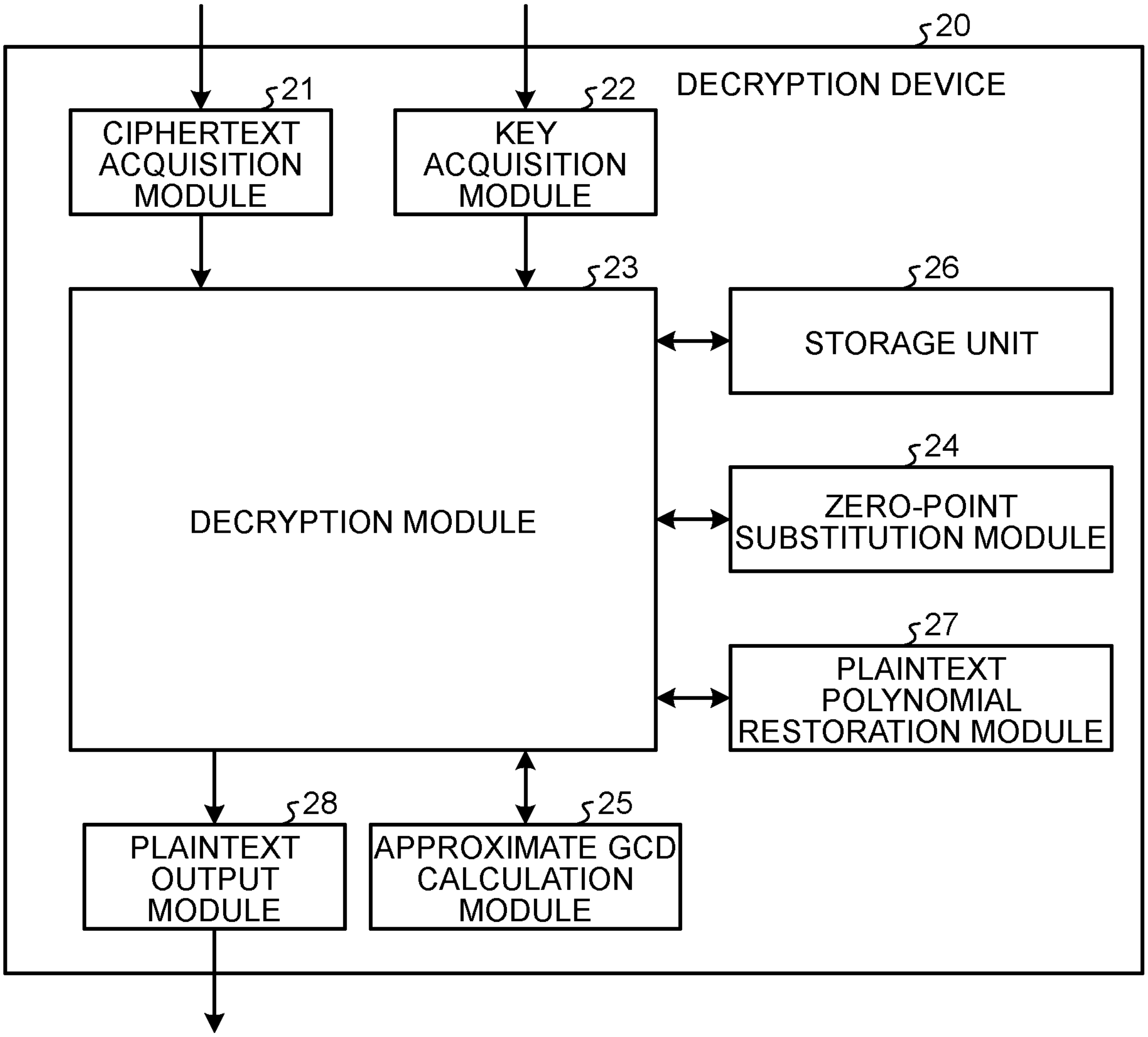
FIG. 5 is a diagram illustrating an example of a functional configuration of a decryption device according to the embodiment.
Figure 6:
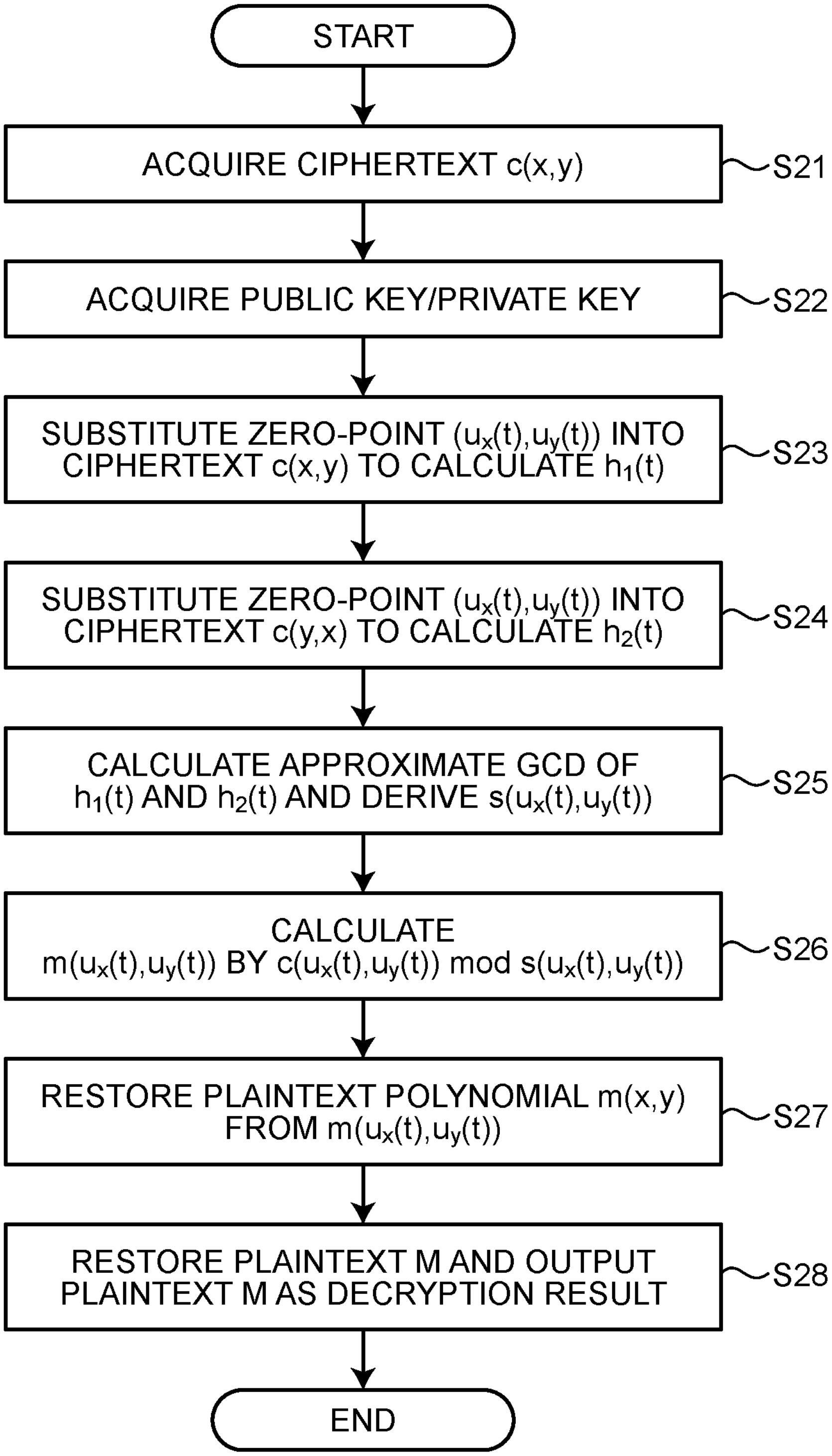
FIG. 6 is a flowchart illustrating an example of a decryption method according to the embodiment.

Next, a configuration and a processing flow of the decryption device according to the present exemplary embodiment will be described with reference to an overall configuration diagram illustrated in FIG. 5 along a flowchart illustrated in FIG. 6.

A decryption device 20 according to the embodiment includes a ciphertext acquisition module 21, a key acquisition module 22, a decryption module 23, a zero-point substitution module 24, an approximate GCD calculation module 25, a storage unit 26, a plaintext polynomial restoration module 27, and a plaintext output module 28.

First, the ciphertext acquisition module 21 acquires a ciphertext c (Step S21). The ciphertext acquisition module 21 acquires a ciphertext c(x,y) from another device via, for example, a network.

Next, the key acquisition module 22 acquires a public key (X(x,y)) and a private key (zero-point u:($u_x(t)$, $u_y(t)$)) (Step S22). The key acquisition module 22 acquires a public key (X(x,y)) from another device or the like via a network, for example, and acquires a private key (zero-point u:$u_x(t)$, $u_y(t)$) from the storage unit 26 or the like of the decryption device 20.

Next, when the decryption module 23 receives the ciphertext c from the ciphertext acquisition module 21 and receives the public key (X(x,y)) and the private key (zero-point u:$u_x(t)$, $u_y(t)$) from the key acquisition module 22, the decryption processing is started.

The decryption module 23 first inputs the ciphertext c(x,y) and the zero-point u to the zero-point substitution module 24. The zero-point substitution module 24 substitutes the zero-point u to c(x,y) and calculates $h_1(t)$ (Step S23). The zero-point substitution module 24 inputs $h_1(t)$ to the decryption module 23.

Next, the zero-point substitution module 24 substitutes the zero-point u into c(y,x) obtained by inverting x and y of the ciphertext, and calculates $h_2(t)$ (Step S24). The zero-point substitution module 24 inputs $h_2(t)$ to the decryption module 23.

Next, upon receiving $h_k(t)$ (k=1, 2) from the zero-point substitution module 24, the decryption module 23 inputs $h_k(t)$ (k=1, 2) and the degree $D_s d+d_{s,2}$ Of $s(u_x(t), u_y(t))$ to the approximate GCD calculating unit 25. The approximate GCD calculation module 25 calculates the approximate GCD of $h_k(t)$ (k=1, 2), and inputs the derived $s(u_x(t), u_y(t))$ e'(t) (where e'(t):=GCD(e ($u_x(t)$, $u_y(t)$),e($u_y(t)$,$u_x(t)$)))) to the decryption module 23 (Step S25).

Next, upon receiving $s(u_x(t), u_y(t))$ e'(t) from the approximate GCD calculation module 25, the decryption module 23 calculates a remainder $m(u_x(t), u_y(t))$ by dividing $h_1$ (t), that is, $c(u_x(t), u_y(t))$ by $s(u_x(t), u_y(t))$ (Step S26).

Next, the plaintext polynomial restoration module 27 restores the plaintext polynomial $m(u_x(t), u_y(t))$ by the method described in [Decryption algorithm] above from m(x,y) calculated in Step S26, the zero-point u, and the system parameter $d_m$ (Step S27). Here, in a case where the plaintext polynomial m(x,y) cannot be restored, the plaintext polynomial restoration module 27 transmits an error to the decryption module 23 and ends the processing.

In a case where the plaintext polynomial m(x,y) is restored, the plaintext output module 28 extracts the plaintext M from the coefficients of the plaintext polynomial m(x,y), outputs the extracted plaintext M (Step S28), and ends the processing.

Figure 7:
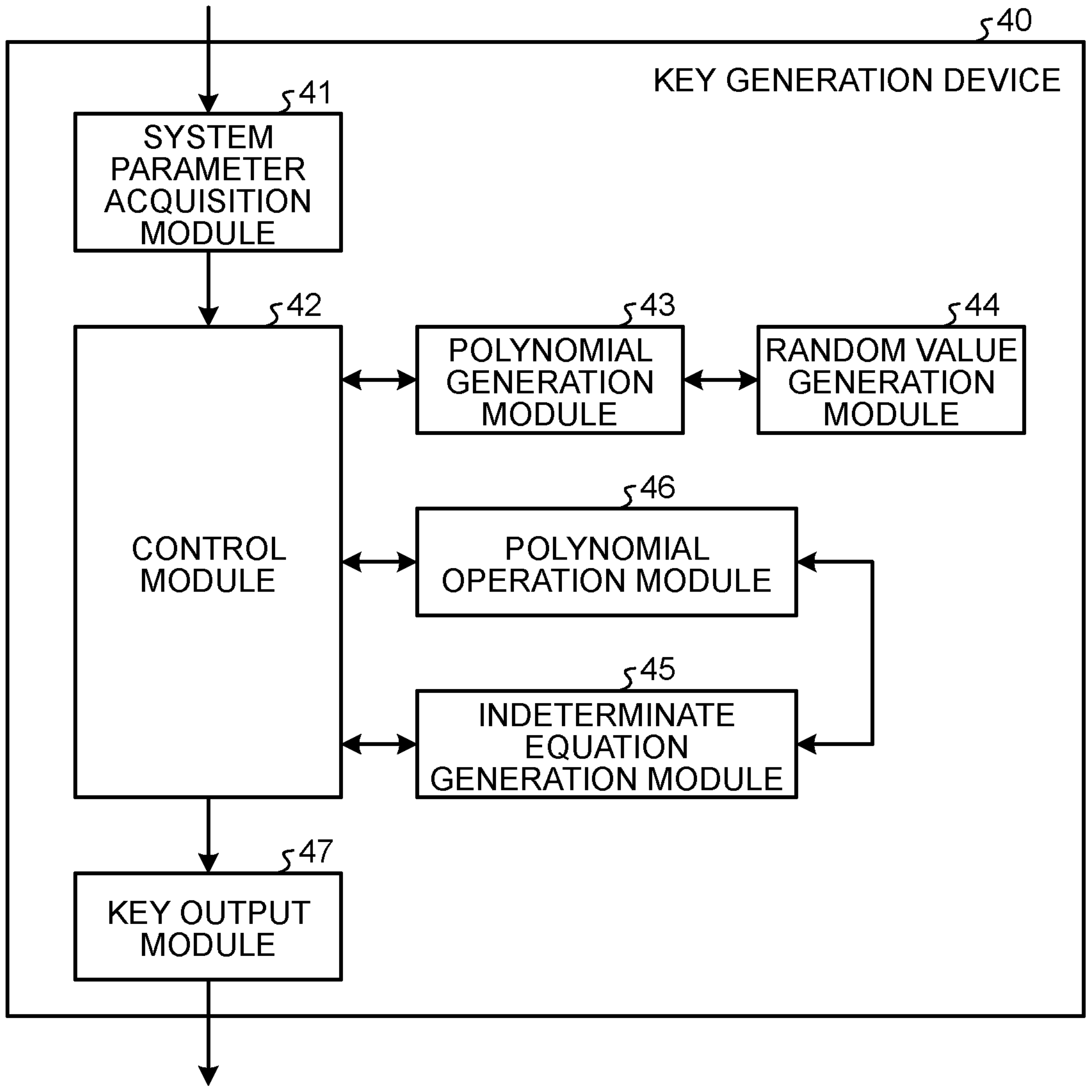
FIG. 7 is a diagram illustrating an example of a functional configuration of a key generation device according to the embodiment.

Next, the configuration of the key generation device according to the present exemplary embodiment and the flow of processing will be described along the flowchart illustrated in FIG. 8 with reference to the overall configuration diagram illustrated in FIG. 7.

A key generation device 40 according to the embodiment includes a system parameter acquisition module 41, a control module 42, a polynomial generation module 43, a random value generation module 44, an indeterminate equation generation module 45, a polynomial operation module 46, and a key output module 47.

First, the system parameter acquisition module 41 acquires the system parameters p, d, $D_x$, $d_{x,v}$ (Step S41). The system parameters p, d, $D_x$, $d_{x,v}$ are acquired, for example, by receiving an input from a user. Further, for example, the system parameters p, d, $D_x$, $d_{x,v}$ are acquired by reading setting data or the like including the system parameters p, d, $D_x$, $d_{x,v}$.

The system parameter acquisition module 41 inputs the system parameters to the control module 42. The control module 42 performs the following processing in cooperation with other processing units on the basis of the system parameter input from the system parameter acquisition module 41.

First, the control module 42 inputs p and d among the system parameters input from the system parameter acquisition module 41 to the polynomial generation module 43, and instructs generation of two d-degree polynomials $u_x(t)$, $u_y(t)$ included in $F_p[t]$. Next, the polynomial generation module 43 instructs the random value generation module 44 to generate 2(d+1) integers from 0 to p−1. The random value generation module 44 generates 2(d+1) random numbers from 0 to p−1 by using, a pseudo random number generation module or the like, and inputs the generated random numbers to the polynomial generation module 43. The polynomial generation module 43 generates polynomials $u_x(t)$, $u_y(t)$ having 2(d+1) random numbers input from the random value generation module 44 as coefficients (Step S42), and inputs the polynomials $u_x(t)$, $u_y(t)$ to the control module 42.

The control module 42 holds (stores) the polynomials $u_x(t)$, $u_y(t)$ received from the polynomial generation module 43 as private keys.

Furthermore, the control module 42 generates a public key (a symmetric indeterminate equation X(x,y) expressed by the following formula (89)).

$$X(x, y) = \sum_{(i,j)\in\Gamma_X} \tau_{ij}(t)x^i y^j \tag{89}$$

First, the control module 42 generates a coefficient other than the constant term of X(x,y) (Steps S43 and S44). Here, the degree $d_{x,2}$ of the coefficient of the quadratic terms of X(x,y) is input to the polynomial generation module 43 with $D_X$=2, and generation of a random polynomial is instructed. The polynomial generation module 43 instructs the random value generation module 44 to generate $d_{x,2}$+1 random values from 0 to p−1, embeds the value input from the random value generation module 44 in the coefficient, and generates the coefficient $\tau_{2,0}(t)$ of the term $x_2$. The polynomial generation module 43 inputs the generated coefficient $\tau_{2,0}(t)$ to the control module 42. The control module 42 holds $\tau_{2,0}(t)$ as the coefficient of $x^2$ and also holds it as the coefficient $\tau_{0,2}(t)$ of the term of $y^2$.

In addition, the control module 42 generates the coefficient $\tau_{1,1}(t)$ of the term xy by the same means. Next, the control module 42 inputs the degree $d_{x,1}$ of the coefficient of the term x to the polynomial generation module 43, and instructs generation of a random polynomial. The polynomial generation module 43 instructs the random value generation module 44 to generate $d_{x,1}$+1 random values from 0 to p−1, embeds the value input from the random value generation module 44 in the coefficient, and generates the coefficient $\tau_{1,0}(t)$ of the term x. The polynomial generation module 43 inputs the generated coefficient $\tau_{1,0}(t)$ to the control module 42. The control module 42 holds $\tau_{1,0}(t)$ as the coefficient of x and also holds it as the coefficient $\tau_{0,1}(t)$ of the term of y.

When the generation of the coefficient of the quadratic terms and the coefficient of the linear term ($\tau_{i,j}(t)$ (0≤i+j≤2)) is completed, the control module 42 inputs the coefficient $\tau_{i,j}(t)$ (0≤i+j≤2) to the indeterminate equation generation module 45 and instructs the generation of the bivariable indeterminate equation X'(x,y) having no constant term. The indeterminate equation generation module 45 performs calculation according to the following formula (90) (Step S45), and inputs the calculated X' (x,y) to the control module 42. Here, the indeterminate equation generation module 45 sends an instruction to the polynomial operation module 46 to execute individual operations.

$$X'(x, y) = \sum_{1 \le i+j \le 2} \tau_{ij}(t) x^i y^j \quad (90)$$

Next, upon receiving the input of X' (x,y) from the indeterminate equation generation module 45, the control module 42 substitutes the private key (polynomial $u_x(t)$, $u_y(t)$) into the variables x and y of X' (x,y) to calculate a provisional constant term by the following formula (91) (Step S46).

$$\bar{\tau}_{0,0}(t) = -X'(u_X(t), u_y(t)) \quad (91)$$

Next, the indeterminate equation generation module 45 and the polynomial operation module 46 perform processing of reducing the degree of the provisional constant term of the above-described expression (91) to generate the indeterminate equation X(x,y) (Step S47).

This degree reduction processing is processing of converting the temporary constant term and the private key $u_x(t)$, $u_y(t)$ into another indeterminate equation having a constant term with the degree of $d_{x,0}$ or less among the indeterminate equations having the same zero-point.

A basic principle is to use a private key (zero-point) to replace with an indeterminate equation with low-degree constant terms having the same zero-point. Since the theoretical background is as described above, only a procedure is illustrated here.

For the sake of simplicity, it is assumed that X(x,y) includes an xy term in the following description. First, the control module 42 instructs the polynomial operation module 46 to calculate the following formula (92) and replaces this value with $\tau_{0,0}(t)$, and instructs the polynomial operation module 46 to calculate the following formula (93) to obtain a polynomial q(t).

$$\bar{\tau}_{0,0}(t) \bmod u_x(t)u_y(t) \quad (92)$$

$$q(t) = \bar{\tau}_{0,0}(t)/u_x(t)u_y(t) \quad (93)$$

Here, q(t) is a quotient obtained by dividing a provisional constant term of the above-described formula (91) by $u_x(t)$ $u_y(t)$, and the degree is $d_{x,2}$. In addition, the degree of $\tau_{0,0}(t)$ is $d_{X,0}$(=2d−1), which satisfies the condition of the above-described expression (31).

Finally, the control module 42 causes the indeterminate equation generation module 45 to calculate X(x,y)=X' (x,y)+ $q(t)xy+\tau_{0,0}(t)$, and sets this output as the indeterminate equation X(x,y) of the public key. The indeterminate equation generation module 45 inputs the indeterminate equation X(x,y) generated in this way to the control module 42.

The control module 42 confirms that the series of processes described above is completed, and inputs the public key X(x,y) and the private key $u_x(t)$, $u_y(t)$ generated in Step S47 to the key output module 47. The key output module 47 outputs the public key (X(x,y) and the private key ($u_x(t)$, $u_y(t)$) input from the control module 42 to the outside of the key generation device 40 (Step S48).

Figure 8:
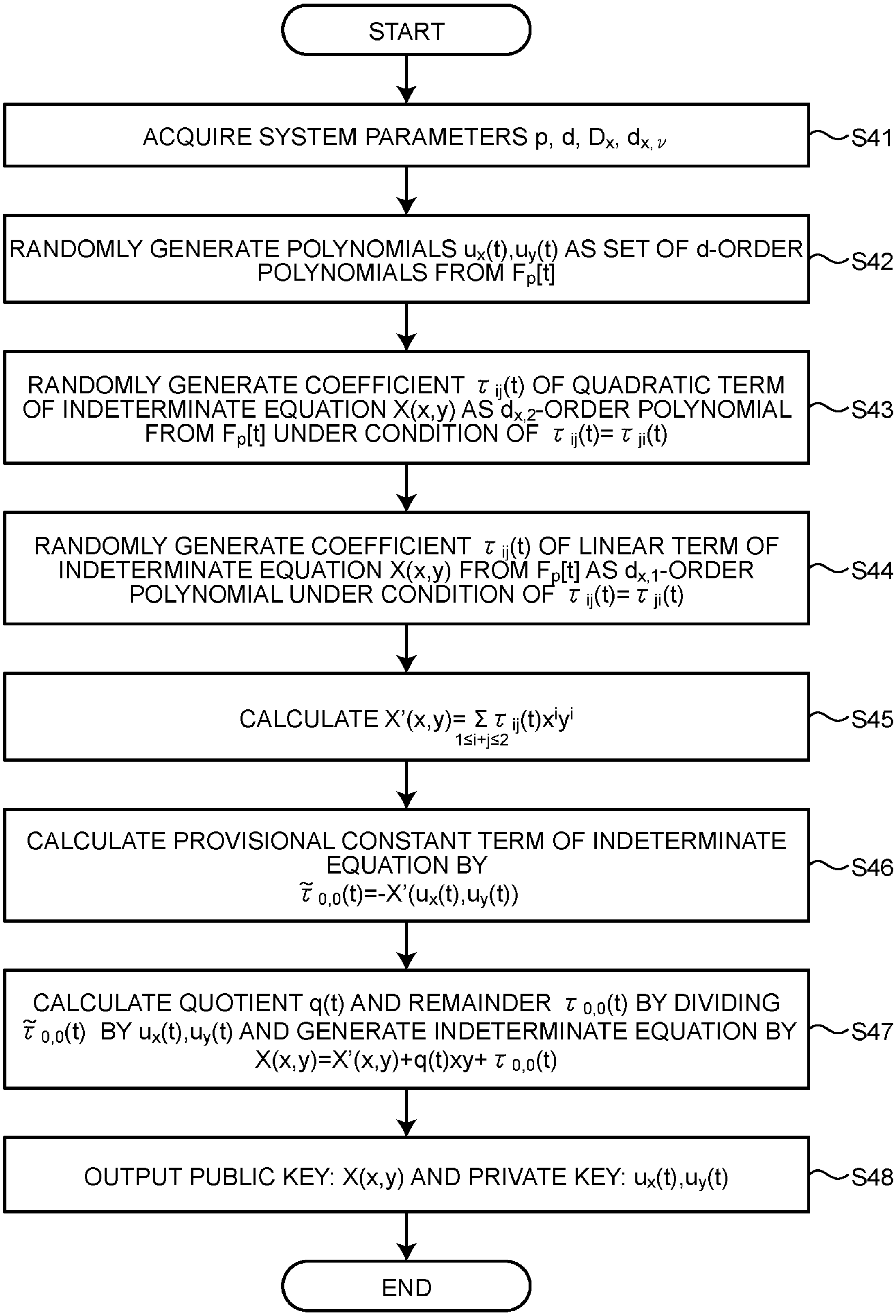
FIG. 8 is a flowchart illustrating an example of a key generation method according to the embodiment.

In the example of the flowchart of FIG. 8, the constant term of the indeterminate equation X(x,y) is not randomly generated, but the constant term of the indeterminate equation X(x,y) may also be generated similarly to the generation processing of the quadratic terms and the linear terms (Steps S42 and S43).

Specifically, a step of randomly generating the constant term $\tau_{0,0}(t)$ of the indeterminate equation X(x,y) as a polynomial of $d_{X,0}$-degree may be added between Steps S44 and S45.

Specific Configuration Related to Variations Described Above

Next, a specific configuration related to the above-described variation (modification) will be described.

The variation of the ciphertext can be realized by calculating the variation by the above-described formula (82) in the step of creating the ciphertext in the encryption module 5 of the encryption device 10 and performing an obvious modification in consideration of this in the decryption device 20.

A variation related to the public key compression can be realized by adding a random number seed to an input to the random value generation module 44 in the key generation device 40, or adding a random number seed used for generation in the random value generation module 44 to an output from the random value generation module 44, and finally changing the input to the public key X(x,y) from the key output module 47 and outputting the adjusted coefficient and the random number seed. Note that, in the encryption device 10 and the decryption device 20, when the public key is input, the original public key X(x,y) can be restored by restoring a coefficient that is not adjusted using the random number seed and adding an adjusted coefficient included in the public key. At this time, the decryption device 20 needs to include a polynomial generation module similar to the polynomial generation module 6 of the encryption device 10 and a random value generation module including the same pseudo-random function as the random value generation module 44 of the key generation device 40.

Regarding the variation related to the public key coefficient, when the random value generation module 44 in the key generation device 40 generates the coefficient of the coefficient $\tau_{ij}(t)$ of the public key X(x,y), the range of random numbers is set to 1 to p−1. In the step of adjusting the coefficients (step of reducing the degree of the constant term $\tau_{0,0}(t)$ of the indeterminate equation by the zero-point ($u_x(t)$, $u_y(t)$)), in a case where the adjusted coefficients $\tau_{1,1}$ (t) and $\tau_{0,0}(t)$ include non-zero coefficients, the adjustment is realized again by starting again from the portion of randomly generating coefficients other than the constant term of the indeterminate equation X(x,y).

Variations regarding how to obtain the term set are realized by changing the system parameters $D_\xi$ and $d_\xi$ (and $d_{\xi,v}$) to the designated term set $\Delta_\xi$ in each of the key generation device 40 and the encryption device 10 and generating a public key, a random polynomial, and a noise polynomial on the basis of $\Delta_\xi$. Here, $\xi$ is X, s, r, or e.

As for variations in embedding the plaintext information also in s(x,y), r(x,y), and e(x,y), the encryption device 10 does not randomly generate s(x,y), r(x,y), and e(x,y), but embeds (a part of) the plaintext in a manner similar to embedding of the plaintext in the polynomial.

Figure 9:
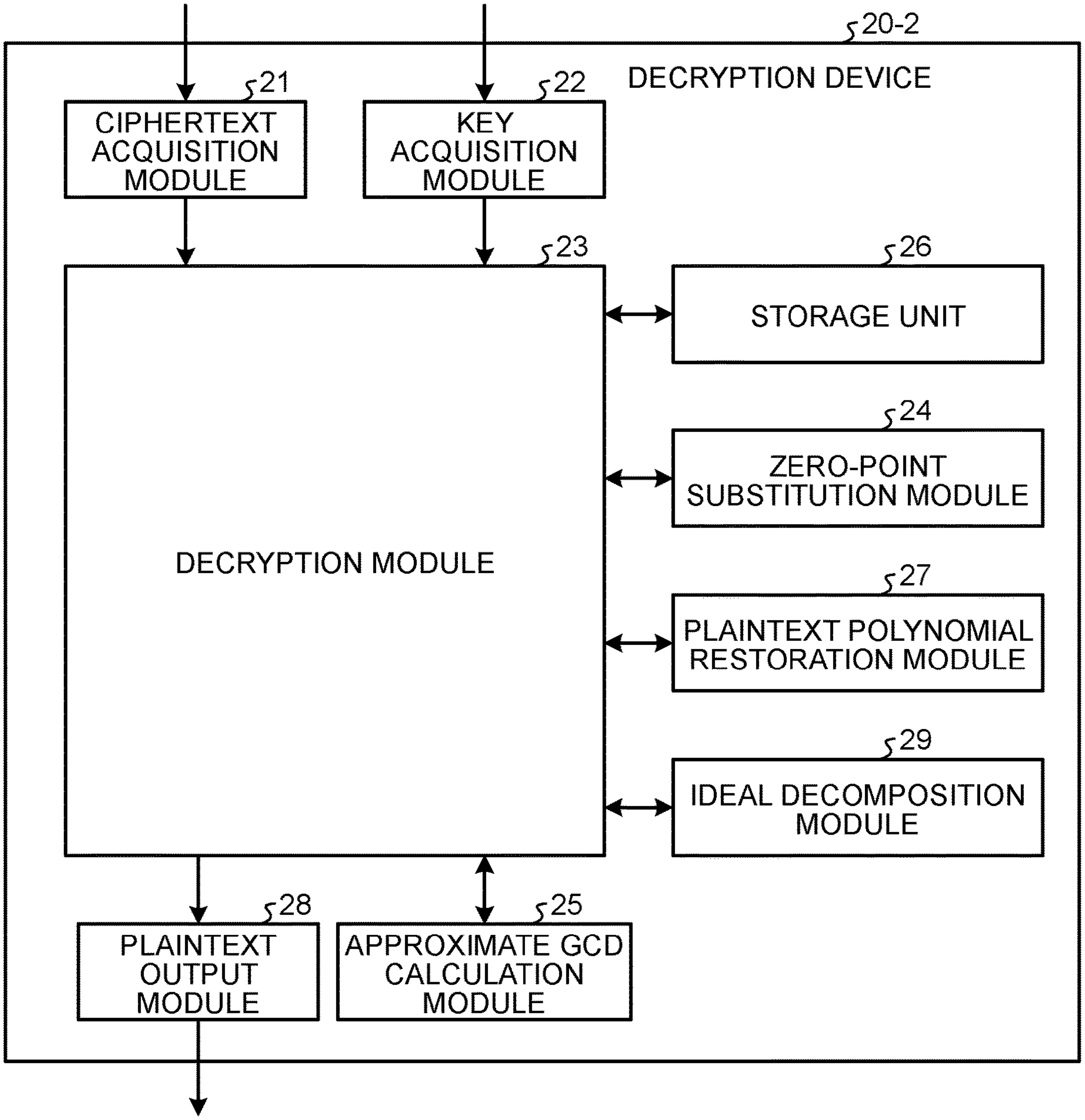
FIG. 9 is a diagram illustrating an example of a functional configuration of a decryption device according to a modification of the embodiment.
Figure 10:
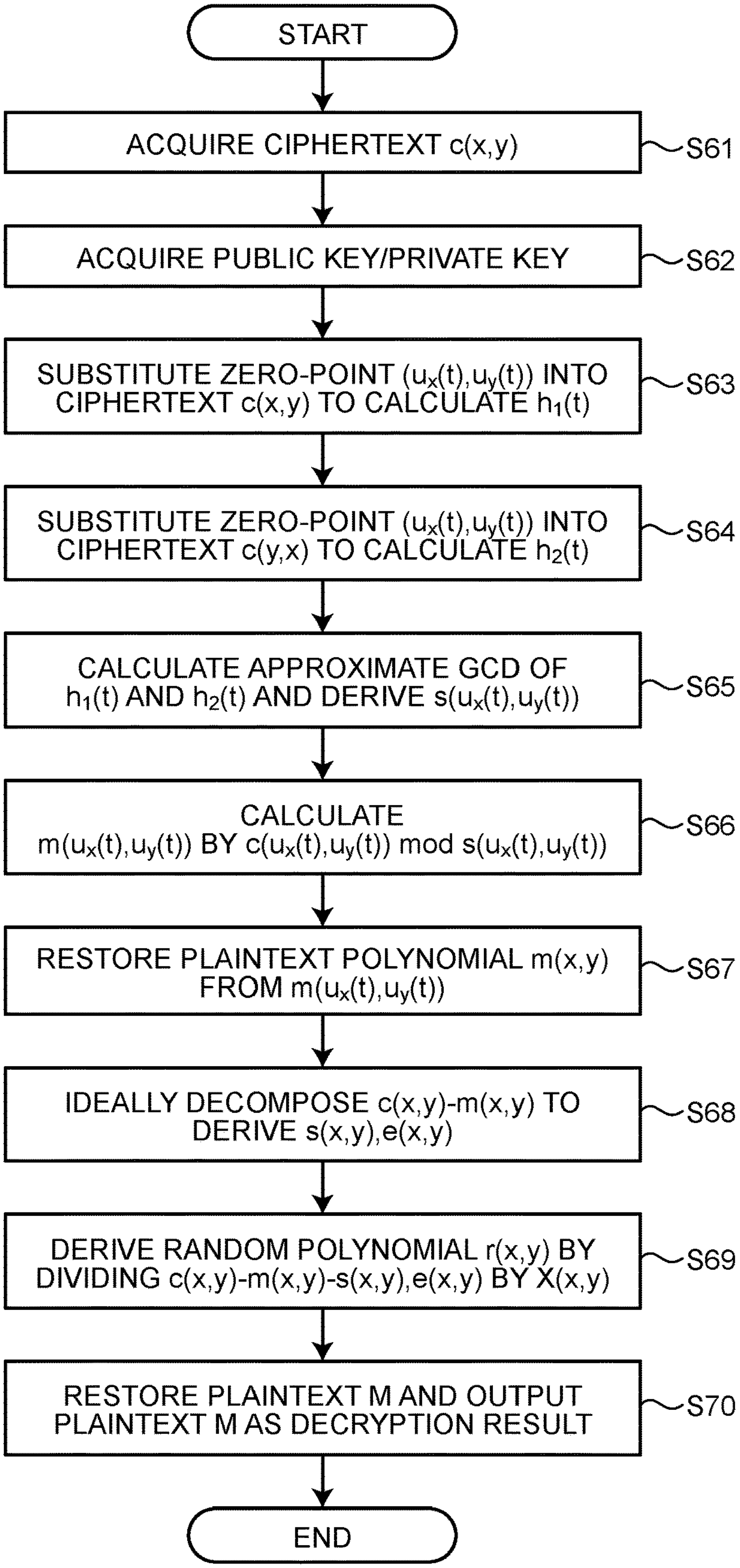
FIG. 10 is a flowchart illustrating an example of a decryption method according to a modification of the embodiment.

Furthermore, in the decryption device of this variation, the configuration and the flow of processing will be described along the flowchart illustrated in FIG. 10 with reference to the overall configuration diagram illustrated in FIG. 9.

A decryption device 20-2 of this variation includes a ciphertext acquisition module 21, a key acquisition module 22, a decryption module 23, a zero-point substitution module 24, an approximate GCD calculation module 25, a storage unit 26, a plaintext polynomial restoration module 27, a plaintext output module 28, and an ideal decomposition module 29. That is, in the decryption device 20-2 of this variation, the ideal decomposition module 29 is added.

In the decryption device 20-2 of this variation, the processing starts with acquiring the ciphertext c(x,y) from the ciphertext acquisition module 21 and acquiring the public key X(x,y) and the private key (zero-point u:$u_x(t)$, $u_y(t)$) from the key acquisition module 22, and the processing (Steps S61 to S67) up to restoring the plaintext polynomial m(x,y) from m($u_x(t)$, $u_y(t)$) is the same as the processing (Steps S21 to S27) of the decryption module 23 of the above-described embodiment. Therefore, here, subsequent processing will be described.

When the plaintext polynomial m(x,y) is successfully restored by the plaintext polynomial restoration module 27, the plaintext polynomial m(x,y) is input to the decryption module 23, and when the restoration fails, an error is input to the decryption module 23. When receiving an error from the plaintext polynomial restoration module 27, the decryption module 23 outputs an error to the plaintext output module 28 and ends the processing.

When receiving the plaintext polynomial m(x,y) from the plaintext polynomial restoration module 27, the decryption module 23 calculates c(x,y)−m(x,y) and inputs c(x,y)−m(x, y) to the ideal decomposition module 29. The ideal decomposition module 29 derives s(x,y) and e(x,y) by ideally decomposing c(x,y)−m(x,y) based on Algorithm 2 (FIG. 2) (Step S68). The ideal decomposition module 29 inputs s(x,y) and e(x,y) to the decryption module 23.

Next, the decryption module derives r(x,y) by calculating the above-described formula (84) by combining s(x,y), e(x,y) and m(x,y) (Step S69).

In each of the above-described steps, when the polynomial cannot be restored, the decryption module 23 notifies the plaintext output module 28 of a decryption error, and the plaintext output module 28 outputs the decryption error and an empty decryption result. In a case where all of m(x,y), s(x,y), e(x,y), and r(x,y) have been restored, the decryption module 23 extracts a plaintext divided from the coefficients of the decrypted plaintext polynomial, and restores the plaintext M from the divided plaintext. The plaintext output module 28 outputs the restored plaintext M (Step S70).

Regarding variations of changing the degree of the approximate GCD in the approximate GCD calculation, an appropriate natural number m may be determined, and the part, for D=degs(t) to degs(t)+n do, in Algorithm 1 (FIG. 1) may be changed as follows:

$$\text{for } D = \text{degs}\,(t) - m \text{ to degs}\,(t) + n \text{ do.}$$

Variations related to the variables can be realized by changing the variables from x,y to $x_1, \ldots, x_n$ in the encryption algorithm, the decryption algorithm, and the key generation algorithm of the above-described embodiments, and making the polynomial X,s a symmetric expression related to at least two of these variables $x_1, \ldots, x_n$.

Note that the private key of the key generation device 40 is ($u_{x1}(t), \ldots, u_{xn}(t)$). In addition, in the decryption device 20, in the processing of substituting the private key u into the ciphertext, only the symmetric portion of the ciphertext $c(x_1, \ldots, x_n)$ is substituted into the inverted polynomial, so that the decryption device can be obviously configured.

For example, in the encryption device 10 of this variation, the public-key acquisition module 2 acquires, as a public key, an n-variable symmetric indeterminate equation $X(x_1, \ldots, x_n)$ that has, as a coefficient, an element of less than or equal to a constant degree of a univariable polynomial ring $F_p[t]$ on a finite field $F_p$ and is determined depending on the total degree of each term, and is symmetric with respect to at least two variables. The plaintext embedding module 3 embeds the plaintext M into coefficients of an n-variable plaintext polynomial $m(x_1, \ldots, x_n)$ having an element of less than or equal to a constant degree of a univariable polynomial ring $F_p[t]$ as coefficients. The polynomial generation module 6 randomly generates an n-variable polynomial $r(x_1, \ldots, x_n)$ having, as a coefficient, an element of less than or equal to a constant degree of the univariable polynomial ring $F_p[t]$, randomly generates an n-variable symmetric polynomial $s(x_1, \ldots, x_p)$ having, as a coefficient, an element of less than or equal to the constant degree of the univariable polynomial ring $F_p[t]$ and determined depending on the total degree of each term, and being symmetric with respect to at least two variables, and randomly generates a noise polynomial $e(x_1, \ldots, x_n)$ having, as a coefficient, an element of less than or equal to the constant degree of the univariable polynomial ring $F_p[t]$. Then, the encryption module 5 generates a ciphertext $c(x_1, \ldots, x_n)$ by encryption processing of performing an operation including at least one of addition, subtraction, and multiplication of an n-variable polynomial $r(x_1, \ldots, x_n)$, an n-variable symmetric polynomial $s(x_1, \ldots, x_n)$, a noise polynomial $e(x_1, \ldots, x_n)$, and an n-variable symmetric indeterminate equation $X(x_1, \ldots, x_n)$ on the n-variable plaintext polynomial $m(x_1, \ldots, x_n)$.

Furthermore, for example, in the decryption device 20 of this variation, the key acquisition module 22 acquires, as a private key, one or more zero-points u of the n-variable symmetric indeterminate equation $X(x_1, x_i, \ldots, x_j, \ldots, x_n)$ having, as a coefficient, an element of less than or equal to a constant degree of the univariable polynomial ring $F_p[t]$ on the finite field $F_p$ and determined depending on the total degree of each term, and being symmetric with respect to at least two variables $x_i$ and $x_j$ ($1 \le i < j \le n$). The zero-point substitution module 24 substitutes the zero-point u into the ciphertext $c(x_1, \ldots, x_n)$ to generate a univariable polynomial $h_1(t)$, and substitutes the zero-point u into the ciphertext $c(x_1, x_i, \ldots, x_j, \ldots, x_n)$ obtained by inverting the variable $x_i$ and the variable $x_j$ of the ciphertext $c(x_1, \ldots, x_j, \ldots, x_i, \ldots, x_n)$ to generate a univariable polynomial $h_2(t)$. The approximate GCD calculation module 25 calculates the approximate GCD of the univariable polynomial $h_k(t)$ (k=1, 2) to obtain a univariable polynomial m(u) obtained by substituting the zero-point u into the n-variable plaintext polynomial $m(x_1, \ldots, x_n)$. The plaintext polynomial restoration module 27 obtains a plaintext polynomial $m(x_1, \ldots, x_n)$ by solving simultaneous linear equations derived from a univariable polynomial m(u) and one or more zero-points u. Then, the decryption module 23 decrypts the plaintext M from the coefficients of the plaintext polynomial $m(x_1, \ldots, x_n)$.

Furthermore, for example, in the key generation device 40 of this variation, the system parameter acquisition module 41 generates, as a public key, the n-variable symmetric indeterminate equation $X(x_1, \ldots, x_n)$ having, as a coefficient, an element that is an element of less than or equal to a constant degree of the univariable polynomial ring $F_p[t]$ on the finite field $F_p$ and is determined depending on the total degree of each term, and that is symmetric with respect to at least two variables, and acquires the prime number p, the degree d, the total degree $D_x$ regarding the variables $x_1, \ldots, x_n$, and the degree $d_{x,\nu}$ of the coefficient of the term of the total degree ν used when one or more zero-points u of the n-variable symmetric indeterminate equation $X(x_1, \ldots, x_n)$ are generated as a private key. The polynomial generation module 43 has n(d+1) random numbers from 0 to p−1 randomly generated as coefficients, generates n d-degree polynomials $u_{x1}(t), \ldots, u_{xn}(t)$ included in the univariable polynomial ring $F_p[t]$, and generates a dx-degree polynomial $\tau_{ij}(t)$ ($i+j=\nu \le D_x$, $\tau_{ji}(t)=\tau_{ij}(t)$) that is a coefficient other than a constant term of the n-variable symmetric indeterminate equation $X(x_1, \ldots, x_n)$. The indeterminate equation generation module 45 calculates a provisional constant term of the n-variable symmetric indeterminate equation $X(x_1, \ldots, x_n)$ from the n polynomials $u_x(t), \ldots, u_{xn}(t)$ and the polynomial $\tau_{ij}(t)$ ($i+j=\nu \le D_x$, $\tau_{ji}(t)=\tau_{ij}(t)$), and generates the n-variable symmetric indeterminate equation $X(x_1, \ldots, x_n)$ based on a quotient obtained by dividing the provisional constant term by the polynomial $u_{xi}(t)u_{xj}(t)$ and a remainder. Then, the key output module 47 outputs n polynomials $u_{xi}(t), \ldots, u_{xn}(t)$ as a private key, and outputs an n-variable symmetric indeterminate equation $X(x_1, \ldots, x_n)$ as a public key.

Regarding variations in which the degree of the coefficient $m_{ij}(t)$ of the plaintext polynomial is changed for each term, a part that changes the above-described embodiment is as follows. First, in the encryption, when the encryption module 5 generates the plaintext polynomial m(x,y), the input of the system parameters p, $D_m$, and $d_m$ to the polynomial generation module 6 is changed. The encryption module 5 of this variation designates p, $d_{m,Dm}$, $d_{m,\,Dm\text{-}1}, \ldots, d_{m,\,1}, d_{m,0}$ for each degree and issues an instruction to the polynomial generation module 6. Here, $d_{m,\nu}$ represents the degree of the νth-degree coefficient of m(x,y).

In decryption, when the approximate GCD, that is, $s(u_x(t), u_y(t))$ can be calculated, the decryption module 23 calculates $m(u_x(t), u_y(t))$ from $h_1(t) \bmod s(u_x(t), u_y(t))$, and inputs $m(u_x(t), u_y(t))$ to the plaintext polynomial restoration module 27 together with the zero-point u and the system parameters d, $d_m$, $D_{m\ dm,\ Dm\text{-}1}, \ldots, d_{m,1}, d_{m,0}$. The plaintext polynomial restoration module 27 inputs the restored m(x,y) to the decryption module 23. When m(x,y) cannot be restored, the plaintext polynomial restoration module 27 inputs an error to the decryption module 23.

For variations in which the indeterminate equation X(x,y) is not a symmetric equation, the configurations of the encryption device 10, the decryption device 20, and the key generation device 40 are the same as those in the above-described embodiment, but each algorithm needs to be partially changed. Here, the difference will be mainly described on the basis of the flowcharts of FIGS. 11 to 13. Note that description similar to the flowchart (FIGS. 4, 6, and 8) of the above-described embodiment will be omitted.

Figure 11:
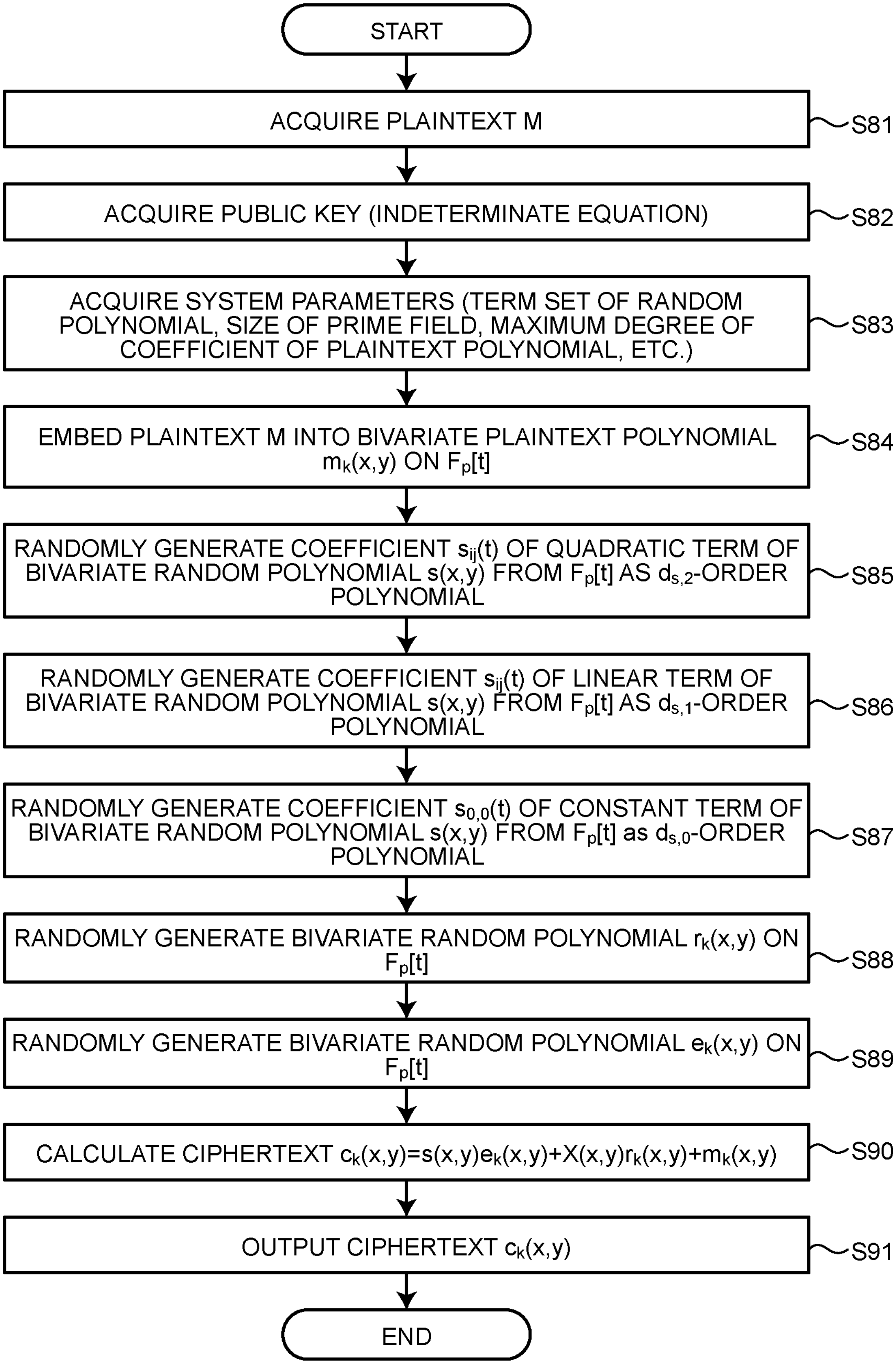
FIG. 11 is a flowchart illustrating an example of an encryption method according to a modification (a case where X(x,y) is not a symmetric equation) of the embodiment.

The encryption algorithm of this variation is illustrated in FIG. 11. In this variation, in addition to the fact that the indeterminate equation X(x,y) which is the public key is not limited to the symmetric equation, there are the following changes.

First, a plurality of plaintext polynomials m(x,y) is prepared. This is referred to as m(x,y). In this variation, $m_k(x,y)$ (k=1, 2) is set. A plaintext M is embedded in the coefficients of the plaintext polynomial (Step S84). s(x,y) is not limited to a symmetric equation, and is generated according to $d_{s,\nu}$ ($\nu=0, 1, \ldots, D_s$). In addition, a plurality of polynomials e(x,y) and r(x,y) are generated (Steps S88 and S89). Here, these are defined as $e_k(x,y)$ and $r_k(x,y)$ (k=1, 2), and the ciphertext $c_k(x,y)$ (k=1, 2) is generated by the following formula (94) (Step S90).

$$c_k(x, y) = s(x, y)c_k(x, y) + X(x, y)r_k(x, y) + m_k(x, y) \ (k = 1, 2) \tag{94}$$

Figure 12:
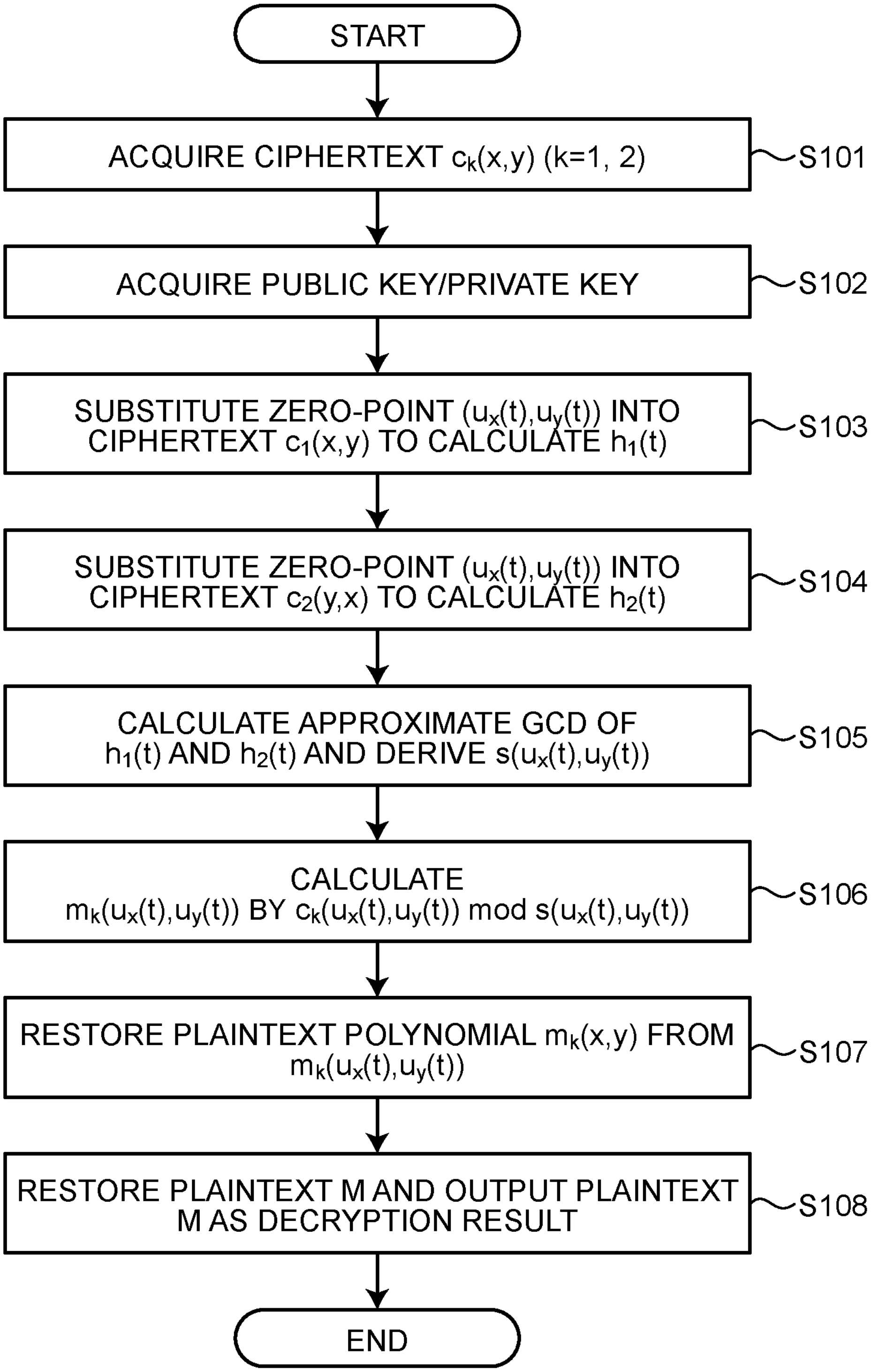
FIG. 12 is a flowchart illustrating an example of a decryption method according to a modification (a case where X(x,y) is not a symmetric equation) of the embodiment.

Only the difference between the present embodiment and the decryption algorithm of this variation will be described with reference to the flowchart illustrated in FIG. 12. In this variation, since two polynomials $c_k(x,y)$ are included as the ciphertext, the private keys are substituted into these polynomials, and $h_1(t)$ and $h_2(t)$ are obtained (Steps S103 and S104).

The processing of the decryption device 20 when the private key is substituted is similar to that in the above-described embodiment. An approximate GCD calculation is executed based on $h_k(t)$, and $s(u_x(t), u_y(t))$ is obtained as the approximate GCD, and $m_k(u_x(t), u_y(t))$ is obtained by the following equation (Step S107).

$$c_k(u_x(t), u_y(t)) \bmod s(u_x(t), u_y(t)).$$

In the above-described embodiment, this operation is performed as follows:

$$c(u_x(t), u_y(t)) \bmod s(u_x(t), u_y(t)) \text{ and}$$

$$c(u_y(t), u_x(t)) \bmod s(u_x(t), u_y(t)).$$

The same applies to the subsequent processing.

FIG. 13 illustrates a flowchart of the key generation algorithm in this variation. Here, when the quadratic terms of X(x,y) are generated (because symmetry is not considered), $\tau_{2,1}(t)$, $\tau_{0,2}(t)$, and $\tau_{1,1}(t)$ are individually generated (Step S123). Similarly, when a linear term of X(x,y) is generated, $\tau_{1,0}(t)$ and $\tau_{0,1}(t)$ are individually generated (Step S124). The other processing is the same as that of the above-described embodiment.

Also in this variation, the variable may be changed from x,y to $x_1, \ldots, x_n$.

For example, in the encryption device 10 of this variation, the public-key acquisition module 2 acquires, as a public key, an n-variable indeterminate equation $X(x_1, \ldots, x_n)$ having, as a coefficient, an element of less than or equal to a constant degree of a univariable polynomial ring $F_p[t]$ on a finite field $F_p$ and determined depending on the total degree of each term. The plaintext embedding module 3 embeds the plaintext M into coefficients of an n-variable plaintext polynomial $m_i(x_1, \ldots, x_n)$ (i=1, 2) having, as the coefficients, elements less than or equal to a constant degree of the univariable polynomial ring $F_p[t]$. The polynomial generation module 6 randomly generates an n-variable polynomial $r_i(x_1, \ldots, x_n)$ having an element of less than or equal to a constant degree of the univariable polynomial ring $F_p[t]$ as a coefficient, randomly generates an n-variable polynomial $s_i(x_1, \ldots, x_n)$ having an element of less than or equal to a constant degree of the univariable polynomial ring $F_p[t]$ and determined depending on the total degree of each term as a coefficient, and randomly generates a noise polynomial $e_i(x_1, \ldots, x_n)$ having an element of less than or equal to a constant degree of the univariable polynomial ring $F_p[t]$ as a coefficient. The encryption module 5 generates a ciphertext $c_i(x_1, \ldots, x_n)$ by encryption processing of performing an operation including at least one of addition, subtraction, and multiplication of an n-variable polynomial $r_i(x_1, \ldots, x_n)$, an n-variable polynomial $s_i(x_1, \ldots, x_n)$, a noise polynomial $e_i(x_1, \ldots, x_n)$, and an n-variable indeterminate equation $X(x_1, \ldots, x_n)$ on the n-variable plaintext polynomial $m_i(x_1, \ldots, x_n)$.

Furthermore, for example, in the decryption device 20 of this variation, the key acquisition module 22 acquires, as a private key, one or more zero-points u of the n-variable indeterminate equation $X(x_1, \ldots, x_n)$ having, as a coefficient, an element of less than or equal to a constant degree of the univariable polynomial ring $F_p[t]$ on the finite field $F_p$ and determined depending on the total degree of each term. The zero-point substitution module 24 substitutes the zero-point u into the ciphertext $c_i(x_1, \ldots, x_n)$ (i=1, 2) to generate a univariable polynomial $h_i(t)$. The approximate GCD calculation module 25 calculates an approximate GCD (Greatest Common Divisor) of the univariable polynomial $h_i(t)$ (i=1, 2) to obtain a univariable polynomial $m_i$ (u) obtained by substituting the zero-point u into the n-variable plaintext polynomial mi$(x_1, \ldots, x_n)$. The plaintext polynomial restoration module 27 obtains a plaintext polynomial $m_i(x_1, \ldots, x_n)$ by solving simultaneous linear equations derived from the univariable polynomial $m_i$ (u) and one or more zero-points u. The decryption module 23 decrypts the plaintext M from the coefficients of the plaintext polynomial $_{mi}(x_1, \ldots, x_n)$.

Furthermore, for example, in the key generation device 40 of this variation, the system parameter acquisition module 41 generates, as a public key, an n-variable indeterminate equation $X(x_1, \ldots, x_n)$ having, as a coefficient, an element that is an element of less than or equal to a constant degree of the univariable polynomial ring $F_p[t]$ on the finite field $F_p$ and is determined depending on the total degree of each term, and acquires the prime number p, the degree d, the total degree $D_x$ regarding the variables $x_1, \ldots, x_p$, and the degree $d_{x,v}$ of the coefficient of the term of the total degree v used when generating one or more zero-points u of the n-variable indeterminate equation $X(x_1, \ldots, x_n)$ as a private key. The polynomial generation module 43 has n(d+1) random numbers from 0 to p−1 randomly generated as coefficients, generates n d-degree polynomials $u_{x1}(t), \ldots, u_{xn}(t)$ included in the univariable polynomial ring $F_p[t]$, and generates a dx-degree polynomial $\tau_{ij}(t)$ ($i+j=v\le D_x$) that is a coefficient other than a constant term of the n-variable indeterminate equation $X(x_1, \ldots, x_n)$. The indeterminate equation generation module 45 calculates a provisional constant term of the n-variable indeterminate equation $X(x_1, \ldots, x_n)$ from the n polynomials $u_{x1}(t), \ldots, u_{xn}(t)$ and the polynomial $\tau_{ij}(t)$ ($i+j=v\le D_x$), and generates the n-variable indeterminate equation $X(x_1, \ldots, x_n)$ based on a quotient obtained by dividing the provisional constant term by the polynomial $u_{xi}(t)\,u_{xj}(t)$ and a remainder. Then, the key output module 47 outputs n polynomials $u_{x1}(t), \ldots, u_{xn}(t)$ as a private key, and outputs an n-variable indeterminate equation $X(x_1, \ldots, x_n)$ as a public key.

Regarding the variation related to the degree of the coefficient of the public key X(x,y), since this variation is a variation related to how to determine the parameters $d_{x,v}$ and $d_{s,v}$, the difference is the system parameter to be input in the key generation device 40 of the above-described embodiment. In addition, in the encryption device 10 and the decryption device 20, only the difference between the parameters stored in the storage units 4 and 26 is obtained, and thus, the configuration of each device of this variation and the processing thereof are similar to those of the above-described embodiment.

The description of the specific configurations of the encryption device 10, the decryption devices 20 and 20-2, and the key generation device 40 according to the present embodiment is thus completed.

Examination of Security

Hereinafter, the security of the public-key cryptography configured in the present embodiment will be considered. Note that the key recovery attack for recovering the private key from the public key is a solution problem of an indeterminate equation without a general solution algorithm, and thus will be considered only in the context of a brute-force attack.

Coefficient Comparison Attack

The coefficient comparison attack is an attack technique in which unknown parts of a plaintext polynomial, a random polynomial, and a noise polynomial in a ciphertext are calculated as variables, and simultaneous equations generated by coefficient comparison with an actual ciphertext are solved to derive the plaintext polynomial together with other unknown parts. In the case of this method, the known part is only the following formula (95).

$$X(x, y) = \sum_{(i,j,k)\in\Delta_X} \mu_{ijk} x^i y^j t^k \tag{95}$$

The unknown part is represented by the following formula (96).

$$\begin{aligned} m &= \sum\nolimits_{(i,j,k)\in\Delta_m} m_{ijk} x^i y^j t^k \\ r &= \sum\nolimits_{(i,j,k)\in\Delta_r} r_{ijk} x^i y^j t^k \\ s &= \sum\nolimits_{(i,j,k)\in\Delta_s} s_{ijk} x^i y^j t^k \\ e &= \sum\nolimits_{(i,j,k)\in\Delta_e} e_{ijk} x^i y^j t^k \end{aligned} \tag{96}$$

When a ciphertext is created on the basis of the above-described formula (51) using these, the following formula (97) is obtained.

$$\begin{aligned} c(x, y) = &\left(\sum\nolimits_{(i,j,k)\in\Delta_s} s_{ijk} x^i y^j t^k\right)\left(\sum\nolimits_{(i,j,k)\in\Delta_e} e_{ijk} x^i y^j t^k\right) + \\ &\left(\sum\nolimits_{(i,j,k)\in\Delta_X} \mu_{ijk} x^i y^j t^k\right)\left(\sum\nolimits_{(i,j,k)\in\Delta_r} r_{ijk} x^i y^j t^k\right) + \sum\nolimits_{(i,j,k)\in\Delta_m} m_{ijk} x^i y^j t^k \end{aligned} \tag{97}$$

Coefficient comparison is performed between the actual ciphertext represented by the above-described formula (97) and the following formula (98). Here, $\mu_{ijk}$ and $c_{ijk}$ are known.

$$c(x, y) = \sum_{(i,j,k)\in\Delta_X} c_{ijk} x^i y^j t^k \tag{98}$$

Here, for the sake of simplicity, it is assumed that the public key X and a polynomial c (=se+Xr+m) on $F_p[t]$ corresponding to the public key X are given under the following conditions. An attack that analyzes only one of $c_1$ and $c_2$ in this manner is referred to as a one-sided attack. Here, for the sake of simplicity, the discussion will proceed with the following formula (99).

$$D_e = D_s = D_X = D_r = 1,\ D_m = 0 \quad (99)$$

$$d_X = d_m = d_s = d_r = d_e = 0$$

Then, m, r, s, and e are expressed by the following formula (100), and $s_{ijk}$, $e_{ijk}$, $r_{ijk}$, and $m_{ijk}$ are variables that take values for $F_p$. In addition, X and c are respectively multiplied by the following formula (101), and $\tau_{ijk}$ and $c_{ijk}$ are constants having values for $F_p$.

$$s(x, y) = s_{100}x + s_{010}y + s_{000} \quad (100)$$

$$e(x, y) = e_{100}x + e_{010}y + e_{000}$$

$$r(x, y) = r_{100}x + r_{010}y + r_{000}$$

$$m(x, y) = m_{000}$$

$$X(x, y) = \tau_{100}x + \tau_{010}y + \tau_{000} \quad (101)$$

$$c(x, y) = c_{200}x^2 + c_{110}xy + c_{020}y^2 + c_{100}x + c_{010}y + c_{000}$$

Here, by comparing the terms of $x^2$, xy, $y^2$, x, and y and the constant term, simultaneous equations of the following formula (102) can be derived.

$$s_{100}e_{100} + \tau_{100}r_{100} = c_{200} \quad (102)$$

$$s_{100}e_{010} + s_{010}e_{100} = \tau_{100}r_{010} + \tau_{010}r_{100} = c_{110}$$

$$s_{010}e_{010} + \tau_{010}r_{010} = c_{020}$$

$$s_{100}e_{000} + s_{000}e_{100} = \tau_{100}r_{000} + \tau_{000}r_{100} = c_{100}$$

$$s_{010}e_{000} + s_{000}e_{010} = \tau_{010}r_{000} + \tau_{000}r_{010} = c_{010}$$

$$s_{000}e_{000} + \tau_{000}r_{000} = m_{000} = c_{000}$$

This simultaneous equation is a nonlinear indeterminate equation since the variable is 10 and the equation is 6. In general, the number of variables is $\#\Delta_{Ds,d}s+\#\Delta_{De,de}+\#\Delta_{Dr,dr}+\#\Delta_{Dm,dm}$, and the number of equations is $\#\Delta_{Dx+Dr,dx+dr}$. When $d_X$ and $d_r$ are increased, it is not an indeterminate equation, but it becomes a solution problem of a nonlinear multivariable simultaneous equation known as NP-hard.

Linear Algebraic Attack

The linear algebraic attack is an attack method in which a nonlinear simultaneous equation is originally derived by linearizing a nonlinear portion in a coefficient comparison attack, but is changed to a linear simultaneous equation. This makes it possible to dramatically reduce the amount of attack calculation. Linearizing the nonlinear portion means setting an unknown part when the nonlinear portion (that is, a portion corresponding to a product) is regarded as a polynomial of a lump. In this method, since the term (plaintext term) in which the plaintext is embedded is nonlinear, such as s(x,y) e(x,y), this portion is collectively set as one polynomial SE(x,y), that is, the ciphertext is set as the following formula (103).

$$c(x, y) = SE(x, y) + X(x, y)r(x, y) + m(x, y) \quad (103)$$

Assuming that the unknown part is SE, r, and m, the unknown part is applied to c(x,y) by using the parameters expressed in the above-described formula (99) to obtain the following formula (104), and the known parts X and c are expressed as in the following formula (105), the following simultaneous formula (106) is derived by the same consideration as the coefficient comparison attack.

$$SE(x, y) = SE_{200}x^2 + SE_{110}xy + SE_{020}y^2 + SE_{100}x + SE_{010}y + SE_{000} \quad (104)$$

$$r(x, y) = r_{100}x + r_{010}y + r_{000}$$

$$m(x, y) = m_{000}$$

$$X(x, y) = \tau_{100}x + \tau_{010}y + \tau_{000} \quad (105)$$

$$c(x, y) = c_{200}x^2 + c_{110}xy + c_{020}y^2 + c_{100}x + c_{010}y + c_{000}$$

$$SE_{200} + \tau_{100}r_{100} = c_{200} \quad (106)$$

$$SE_{110} + \tau_{100}r_{010} = \tau_{010}r_{100} = c_{110}$$

$$SE_{020} + \tau_{010}r_{010} = c_{020}$$

$$SE_{100} + \tau_{100}r_{000} = \tau_{000}r_{100} = c_{100}$$

$$SE_{010} + \tau_{010}r_{000} = \tau_{000}r_{010} = c_{010}$$

$$SE_{000} + \tau_{000}r_{000} = m_{000} = c_{000}$$

This simultaneous equation is a linear indeterminate equation since the variable is 10 and the equation is 6. In general, the number of variables is $\#\Delta_{Dx+Dr,dx+dr}+\#\Delta_{Dr,dr}+\#\Delta_{Dm,dm}$, and the number of equations is $\#\Delta_{Dx+Dr,dx+dr}$. From this, there is a solution space of only $\#\Delta_{Dr,dr}+\#\Delta_{Dm,dm}$ dimensions. In fact, when an arbitrary element of $F_p$ is substituted into the variables $r_{ijk}$ and $m_{ijk}$, $SE_{ijk}$ corresponding thereto is obtained. However, the correct $SE_{ijk}$ as a decryption result is one of them, and the only way to determine this is to check that the factorization of the derived SE(x,y) results in s(x,y) e(x,y). The only known way to do this so far is to brute-force the solution space (other than by the coefficient comparison attack). Therefore, if a solution space having a sufficient size to avoid a brute-force attack is obtained, this attack can be prevented.

Brute-Force Attack

The resistance to various attacks described above is basically evaluated by a calculation amount of solving simultaneous equations, but these are reconsidered from the viewpoint of a brute-force attack. In the coefficient comparison attack, by brute-force hitting m(x,y), s(x,y) and e(x,y) can be obtained by ideal decomposition by the same means as decryption. Considering in this way, the number of round trips of m(x,y) becomes $p^{10(dm+1)}$ when $D_m$=3 (because it is the power of the number of individuals of the variable of the gauge number p of the finite field), and the calculation amount also increases exponentially. The same applies to the linear algebraic attack.

Also in the key recovery attack, it is necessary to obtain both ($u_x(t)$, $u_y(t)$) when solving the multivariable simultaneous equations. However, this can be obtained by brute-forcing one (for example, $u_x(t)$) and solving $X(u_x(t),y)=0$ for the corresponding one (($u_y(t)$ in this case). Taking these together, it is necessary to consider the brute-forcing of $u_x(t)$, and the number of brute-forces is $p^{d+1}$, which also increases exponentially.

From the above-described consideration, it is found that the amount of calculation increases exponentially in any existing attack, and the encryption of the present embodiment has sufficient security.

Finally, an example of a hardware configuration of the encryption device 10, the decryption devices 20 and 20-2, and the key generation device 40 according to the embodiment will be described.

Example of Hardware Configuration

Figure 14:
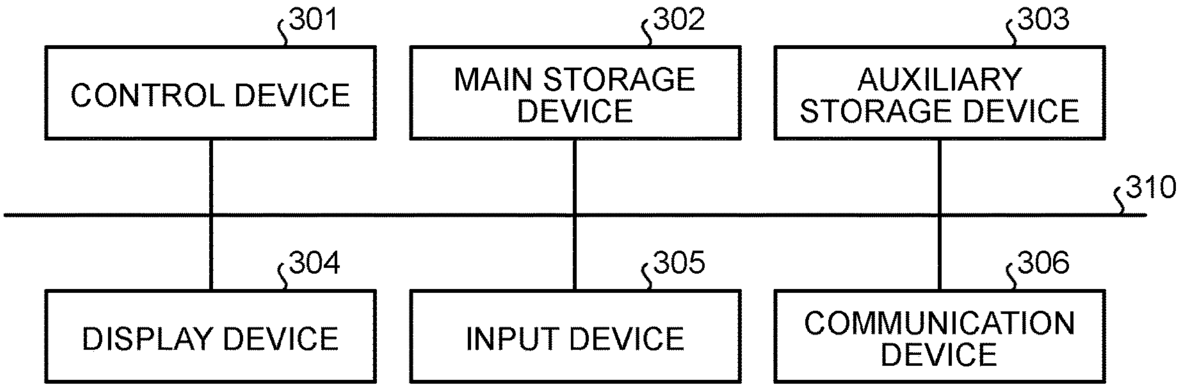
FIG. 14 is a diagram illustrating an example of a hardware configuration of an encryption device, a decryption device, and a key generation device according to the embodiment.

FIG. 14 is a diagram illustrating an example of a hardware configuration of the encryption device 10, the decryption devices 20 and 20-2, and the key generation device 40 according to the embodiment.

The encryption device 10, the decryption devices 20 and 20-2, and the key generation device 40 of the embodiment include a control device 301, a main storage device 302, an auxiliary storage device 303, a display device 304, an input device 305, and a communication device 306. The control device 301, the main storage device 302, the auxiliary storage device 303, the display device 304, the input device 305, and the communication device 306 are connected via a bus 310.

The control device 301 executes a program read from the auxiliary storage device 303 to the main storage device 302. The main storage device 302 is a memory such as a read only memory (ROM) and a random access memory (RAM). The auxiliary storage device 303 is a hard disk drive (HDD), a solid state drive (SSD), a memory card, or the like.

The display device 304 displays display information. The display device 304 is, for example, a liquid crystal display or the like. The input device 305 is an interface for operating a computer. The input device 305 is, for example, a keyboard, a mouse, or the like. When the computer is a smart device such as a smartphone and a tablet terminal, the display device 304 and the input device 305 are, for example, touch panels. The communication device 306 is an interface for communicating with other devices.

The program executed by the computer is recorded as a file in an installable format or an executable format in a computer-readable storage medium such as a CD-ROM, a memory card, a CD-R, and a digital versatile disc (DVD), and is provided as a computer program product.

In addition, the program executed by the computer may be stored on a computer connected to a network such as the Internet and provided by being downloaded via the network. In addition, the program executed by the computer may be provided via a network such as the Internet without being downloaded.

In addition, the program executed by the computer may be provided by being incorporated in a ROM or the like in advance.

The program executed by the computer has a module configuration including functional blocks that can also be realized by the program among the functional configurations (functional blocks) of the encryption device 10, the decryption devices 20 and 20-2, and the key generation device 40 of the embodiment. As actual hardware, each functional block is loaded on the main storage device 302 by the control device 301 reading and executing a program from the storage medium. That is, the functional blocks are generated on the main storage device 302.

Some or all of the functional blocks described above may not be implemented by software, but may be implemented by hardware such as an integrated circuit (IC).

In addition, in a case where each function is realized by using a plurality of processors, each processor may realize one of the functions or may realize two or more of the functions.

In addition, the operation form of the computer that implements the encryption device 10, the decryption devices 20 and 20-2, and the key generation device 40 of the embodiment may be arbitrary. For example, the encryption device 10 (decryption devices 20 and 20-2, key generation device 40) may be realized by one computer. Furthermore, for example, the encryption device 10, the decryption devices 20 and 20-2, and the key generation device 40 may be operated as a cloud system on a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A key generation device comprising:

a memory; and one or more processors coupled to the memory and configured to:

generate, as a public key, an n-variable indeterminate equation $X(x_1, \ldots, x_n)$ having, as a coefficient, an element that is less than or equal to a constant degree of a univariable polynomial ring $F_p[t]$ on a finite field $F_p$ and is determined depending on a total degree of each term, and acquire a prime number p, a degree d, a total degree $D_x$ regarding variables $x_1, \ldots, x_n$, and a degree $d_{x,v}$ of a coefficient of a term of the total degree v, which are used when one or more zero-points u of the n-variable indeterminate equation $X(x_1, \ldots, x_n)$ are generated as a private key;

generate n d-degree polynomials $u_{x1}(t), \ldots, u_{xn}(t)$ included in the univariable polynomial ring $F_p[t]$, the n d-degree polynomials having n(d+1) random numbers from 0 to p−1 randomly generated as coefficients, and generate the $dx_{,v}$-degree polynomial $\tau_{ij}(t)$ ($i+j=v \le D_x$) that is a coefficient other than a constant term of the n-variable indeterminate equation $X(x_1, \ldots, x_n)$;

calculate a provisional constant term of the n-variable indeterminate equation $X(x_1, \ldots, x_n)$ from the n polynomials $u_{x1}(t), \ldots, u_{xn}(t)$ and the polynomial $\tau_{ij}(t)$ ($i+j=v \le Dx$), and generate the n-variable indeterminate equation $X(x_1, \ldots, x_n)$ based on a quotient and a remainder obtained by dividing the provisional constant term by a polynomial $u_{xi}(t)u_{xj}(t)$; and output the n polynomials $u_{x1}(t), \ldots, u_{xn}(t)$ as the private key to an application that decrypts data encrypted with the public key and output the n-variable indeterminate equation $X(x_1, \ldots, x_n)$ as the public key to the application, wherein the n-variable indeterminate equation $X(x_1, \ldots, x_n)$ is a symmetric indeterminate equation that is symmetric with respect to at least two variables, and the one or more processors are configured to generate the $dx_{,v}$-degree polynomial $\tau_{ij}(t)$ ($i+j=v \le Dx$) to be $\tau_{ji}(t)=\tau_{ij}(t)$.

* * * * *